United States Patent [19]

Earls et al.

[11] Patent Number: 5,510,431
[45] Date of Patent: Apr. 23, 1996

[54] CURE CONTROLLED CATALYZED MIXTURES OF EPOXY RESINS AND CURING AGENTS CONTAINING MESOGENIC MOIETIES

[75] Inventors: Jimmy D. Earls; Robert E. Hefner, Jr.; James L. Bertram, all of Lake Jackson; Louis L. Walker, Clute, all of Tex.

[73] Assignee: The Dow Chemical Company, Midland, Mich.

[21] Appl. No.: 457,070

[22] Filed: Jun. 1, 1995

Related U.S. Application Data

[62] Division of Ser. No. 196,355, Feb. 15, 1994, Pat. No. 5,458,929.

[51] Int. Cl.$^6$ .......... C08G 59/06; C08G 59/10; C08L 63/00; C08L 63/02

[52] U.S. Cl. .......... 525/481; 525/482; 525/523; 525/526; 525/528; 525/533; 528/96; 528/97; 528/98; 528/99; 528/100; 528/101; 528/104

[58] Field of Search .......... 528/101, 96–100, 528/104; 525/481, 482, 523, 526, 528, 533

[56] References Cited

U.S. PATENT DOCUMENTS

| | | |
|---|---|---|
| 3,725,341 | 4/1973 | Rogers et al. |
| 3,738,862 | 6/1973 | Klarquist et al. |
| 4,594,291 | 6/1986 | Bertram et al. |
| 4,717,674 | 1/1988 | Sung .......... 436/85 |
| 4,725,652 | 2/1988 | Bertram et al. |
| 4,925,901 | 2/1990 | Bertram et al. |
| 4,946,817 | 8/1990 | Bertram et al. |
| 5,134,239 | 7/1992 | Bertram et al. |
| 5,140,079 | 8/1992 | Muskopf et al. |
| 5,169,473 | 12/1992 | Bertram et al. |
| 5,266,405 | 11/1993 | Kirchmeyer et al. |
| 5,266,660 | 11/1993 | Hefner, Jr. et al. |
| 5,266,661 | 11/1993 | Earls et al. |
| 5,270,404 | 12/1993 | Earls et al. |
| 5,270,405 | 12/1993 | Earls et al. |
| 5,270,406 | 12/1993 | Earls et al. |
| 5,281,675 | 1/1994 | Hefner, Jr. et al. |

FOREIGN PATENT DOCUMENTS

| | | | |
|---|---|---|---|
| 0328020A3 | 8/1989 | European Pat. Off. | C08G 59/68 |
| 0430143A3 | 6/1991 | European Pat. Off. | C08G 59/00 |
| 0473935A3 | 3/1992 | European Pat. Off. | C08G 59/50 |

*Primary Examiner*—John C. Bleutge
*Assistant Examiner*—D. R. Wilson

[57] ABSTRACT

Curable compositions containing (A) one or more epoxy resins, one (B) or more curing agents and (C) one or more cure controlling catalysts wherein at least one of components (A) or (B) or both components (A) and (B) contain a mesogenic moiety are prepared. These curable compositions permit processing at higher temperatures and improved properties. They are useful in the preparation of coatings, castings, electrical or laminates or composites and the like.

6 Claims, No Drawings

CURE CONTROLLED CATALYZED MIXTURES OF EPOXY RESINS AND CURING AGENTS CONTAINING MESOGENIC MOIETIES

CROSS-REFERENCE TO RELATED APPLICATION

This application is a division of application Ser. No. 08/196,355 filed Feb. 15, 1994, now U.S. Pat. No. 5,458,929, which is incorporated herein by reference in its entirety.

FIELD OF THE INVENTION

The present invention concerns curable (thermosettable) mixtures of at least one epoxy resin and at least one curing agent therefor, one or more of which contain mesogenic moieties, and at least one cure controlling catalyst therefor, as well as the cured (thermoset) compositions prepared therefrom.

BACKGROUND OF THE INVENTION

Epoxy resins are well established as a class of curable compositions which find efficacy in a myriad of applications. The curing of epoxy resins is effected by a wide range of curing agents including, for example, the primary and secondary aliphatic, cycloaliphatic and aromatic polyamines; dicarboxylic acids and the anhydrides thereof; aromatic hydroxyl containing compounds; imidazoles; guanidines; urea-aldehyde resins and alkoxylated derivatives thereof; melamine-aldehyde resins and alkoxylated derivatives thereof; amidoamines; epoxy resin adducts; and various combinations thereof. In addition to said curing agents, one or more catalysts, such as a quaternary ammonium or phosphonium salts are frequently added to accelerate the cure rate as well as to insure completeness of the cure. In the curing of epoxy resins with curing agents using catalysts, a number of factors are critical to and interrelate to the curing process for curable compositions containing mesogenic moieties relative to conventional, non-mesogenic curable compositions, directly as a result of the presence of the mesogenic moieties. These factors include the relatively higher processing temperatures required to melt or dissolve most mesogenic epoxy resins or mesogenic curing agents in the presence of a catalyst as well as the development and maintainance of the desired morphology under the curing time and temperature profile employed. Thus, attempting to cure a curable mixture of epoxy resin and a curing agent, one or both of which contain mesogenic moieties, in the presence of a catalyst under conditions required for melt processing of said curable mixture frequently results in premature crosslinking of the matrix due to the cure accelerating effect of the catalyst. The result of this premature crosslinking is higher viscosities, lack of control over the type of morphology attained in the cured state, underdevelopment of the liquid crystalline morphology and a subsequent deleterious impact on mechanical properties of the cured product.

The present invention provides novel curable mixtures comprising at least one epoxy resin and at least one curing agent therefor, and at least one cure controlling catalyst therefor; wherein, at least one of the epoxy resins or at least one of the curing agents contains at least one mesogenic moiety.

It has been discovered that in curable compositions containing mesogenic moieties, the use of a cure controlling catalyst allows higher processing temperatures to be used for melting or dissolving the mesogenic epoxy resin and/or mesogenic curing agent, and lower viscosities and greater control over the morphologies and properties are also obtained. Thus, for curable compositions containing mesogenic moieties of the present invention, lower levels of crosslinking at high temperatures prior to catalyst activation and improved processability have been achieved through the use of a cure controlling catalyst. Additionally, the fracture toughness achieved for curable compositions containing mesogenic moieties and a cure controlling catalyst has been found to be unexpectably higher than that obtained for curable compositions which contain non-mesogenic moieties.

SUMMARY OF THE INVENTION

One aspect of the present invention pertains to curable compositions comprising
(A) at least one epoxy resin having an average of more than one vicinal epoxide group per molecule;
(B) at least one curing agent for said epoxy resin; and
(C) at least one cure controlling catalyst;
wherein at least one of components (A) or (B) contain at least one mesogenic moiety.

A further aspect of the present invention pertains to the product resulting from B-staging (partially curing) said curable compositions.

A further aspect of the present invention pertains to the product resulting from curing said curable compositions wherein said curable compositions have been subjected to either (a) the application of an electric field, (b) the application of a magnetic field, (c) drawing or shear forces, or (d) any combination thereof either (i) before curing or processing, (ii) during curing or processing, or (c) both before and during curing or processing.

A still further aspect of the present invention pertains to cured products such as, for example, coatings, laminates, composites, adhesives, castings, encapsulated articles, molded articles and the like resulting from curing the aforementioned curable compositions.

The compositions and products of the present invention can consist of, consist essentially of or comprise the enumerated components.

The invention disclosed herein suitably can also be practiced in the absence of any component which is not specifically disclosed or enumerated herein.

DETAILED DESCRIPTION OF THE INVENTION

DEFINITIONS

The term "cure controlling" means that the curable blend of epoxy resin, curing agent and cure controlling catalyst has a viscosity after 15 minutes at 120° C. of 75 percent or less than the viscosity of a like curable composition except that the catalyst is non-cure controlling.

The term "hydrocarbyl" as employed herein means any monovalent or polyvlent aliphatic, cycloaliphatic, aromatic, aryl substituted aliphatic or cycloaliphatic or aliphatic or cycloaliphatic substituted aromatic groups. The aliphatic or cycloaliphatic groups can be saturated or unsaturated. The "hydrocarbyl" groups can be monovalent or polyvalent as appropriate. Likewise, the term "hydrocarbyloxy" means a hydrocarbyl group having an oxygen linkage between it and the carbon atom to which it is attached.

The term "inertly substituted" means that the hydrocarbyl or hydrocarbyloxy group contains a substitutent that does not react with any of the components with which the compound containing such substituents is associated. Such inert substituents include —$CH_3$, —$OCH_3$, —F, —Cl, —Br, —$NO_2$, —CN and the like.

The term "mesogenic" or "mesogen" as is used herein designates compounds containing one or more rigid rodlike structural units which have been found to favor the formation of liquid crystal phases in the case of low molar mass substances. Thus the mesogen or mesogenic moiety is that structure responsible for molecular ordering. The term mesogenic is further defined by R. A. Weiss red.) and C. K. Ober (ed.) in *Liquid-Crystalline Polymers*, ACS Symposium Series 435 (1989) on pages 1–2: "The rigid unit responsible for the liquid crystalline behavior is referred to as the mesogen," and "Liquid crystalline order is a consequence solely of molecular shape anisotropy, such as found in rigid rodshaped molecules . . . " and "Liquid crystal is a term that is now commonly used to describe materials that exhibit partially ordered fluid phases that are intermediate between the three dimensionally ordered crystalline state and the disordered or isotropic fluid state. Phases with positional and/or orientational long-range order in one or two dimensions are termed mesophases. As a consequence of the molecular order, liquid crystal phases are anisotropic, i.e., their properties are a function of direction." Further definition of the term mesogenic may be found in Polymeric Liquid Crystals, Alexandre Blumstein (ed.), (1983) on pages 2–3: "Compounds forming small molecule thermotropic liquid crystals usually have the following molecular structural features:—high length:breadth (axial) ratio—rigid units such as 1,4-phenylene, 1,4-bicyclooctyl, 1,4-cyclohexyl, etc.,—rigid central linkages between rings such as —COO—, —CH=CH—, —N=NO—, —N=N—, etc. —anisotropic molecular polarization."

The terms "curable" and "thermosettable" are used synonymously throughout and mean that the composition is capable of being subjected to conditions which will render the composition to a cured or thermoset state or condition.

The terms "cured" and "thermoset" are used synonymously throughout. The term "thermoset" is defined by L. R. Whittington in *Whittington's Dictionary of Plastics* (1968) on page 239: "Resin or plastics compounds which in their final state as finished articles are substantially infusible and insoluble. Thermosetting resins are often liquid at some stage in their manufacture or processing, which are cured by heat, catalysis, or some other chemical means. After being fully cured, thermosets cannot be resoftened by heat. Some plastics which are normally thermoplastic can be made thermosetting by means of crosslinking with other materials." Resins which have been "cured" or "thermoset" are usually insoluble, infusible products.

The term "B-staging" or "B-staged" as employed herein designates that partial curing (partial thermosetting or partial crosslinking) of a curable composition has occurred. The term "B-stage" is defined in *The Epoxy Resin Formulators Training Manual*, by The Society of the Plastics Industry, Inc. (1985) on pages 270–271 as:

"An intermediate stage in the reaction of certain thermosetting resins in which the material softens when heated and swells when in contact with certain liquids, but may not entirely fuse or dissolve."

The term "weak-nucleophilic" as employed herein means that a material has a nucleophilicity value "n" from greater than zero to less than 2.5, peferably from about 0.5 to about 2, more preferably from 1 to about 2, as described by C. G. Swain and C. B. Scott in *J. Am. Chem. Soc.*, 75, 141 (1953), which is incorporated herein by reference in its entirety.

NUMERICAL VALUES RECITED HEREIN

Any numerical values recited herein include all values from the lower value to the upper value in increments of one unit provided that there is a separation of at least 2 units between any lower value and any higher value. As an example, if it is stated that the amount of a component is, for example, from 1 to 90, preferably 20 to 80, more preferably from 30 to 70, it is intended that values such as 15–85, 22–68, 43–51, 30-32 etc. are expressly enumerated in this specification. Usually, for values which are less than one, one unit is considered to be 0.1; therefore, the minimum separation between any lower value and any higher value is 0.2. However, for the amounts of cure controlling catalysts, one unit is considered to be 0.00001, 0.0001, 0.001, 0.01 or 0.1 as appropriate. These are only examples of what is specifically intended and all possible combinations of numerical values betwen the lowest value and the highest value enumerated are to be considered to be expressly stated in this application in a similar manner.

CURE controlling CATALYSTS

Suitable cure controlling catalysts for effecting the reaction between the epoxy resin and the curing agent include those disclosed in U.S. Pat. Nos. 4,594,291; 4,725,652; 4,925,901; 4,946,817; 5,134,239; 5,140,079, and 5,169,473, all of which are incorporated herein by reference. Of these cure controlling catalysts particularly suitable are those prepared by reacting an onium or amine compound with an acid having a weak-nucleophilic anion.

Some of the suitable cure controlling catalysts include those represented by any of the following three formulas

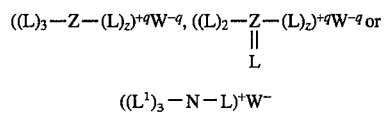

$$((L^1)_3 - N - L)^+ W^-$$

wherein each L is independently a hydrocarbyl group or inertly substituted hydrocarbyl group having from 1 to about 18, preferably from 1 to about 12, more preferably from 1 to about 9, carbon atoms, which group also can contain one or more oxygen, sulfur or nitrogen atoms or two of such L groups can combine to form a heterocyclic ring containing one or more atoms other than carbon atoms; each $L^1$ is independently hydrogen or L; Z is nitrogen, phosphorus, sulfur or arsenic; W is a weak nucleophilic anion, preferably $BF_4^-$, $BCl_4^-$, $NO_3^-$, $F^-$, $Cl$—$CH_2$—$CH_2$—$CO_2^-$, $HO$—$CH_2CH_2$—$CO_2^-$, $SbF_5^-$, $SbCl_5^-$, $AsF_4^-$, $AsCl_4^-$, $FP(O)_2(OH)^-$, $(F)_2P(O)_2^-$, $F_3B(OH)^-$, $F_2B(OH)_2^-$, $ClP(O)_2(OH)^-$, more preferably $BF_4^-$, $BCl_4^-$; z has a value of zero or 1 depending on the valence of Z; and q has a value equal to the valence of the anion W.

Particularly preferred cure controlling catalysts include, for example, tetrabutylphosphonium tetrahaloborate, ethyl(tritolyl)phosphonium tetrahaloborate, ethyl(tritolyl)ammonium tetrahaloborate, benzyltrimethylammonium tetrahaloborate, tetrabutylammonium tetrahaloborate, triethylamine.tetrahaloboric acid complex, tributylamine.tetrahaloboric acid complex, N,N'-dimethyl-1,2-diaminoethane.tetrahaloboric acid complex, and any combination thereof and the like.

When employed to form the compositions of the present invention the cure controlling catalysts are present in quantities which provide from about 0.00005 to about 0.1, preferably from about 0.00005 to about 0.05, most preferably from about 0.0001 to about 0.03 mole of catalyst per epoxide equivalent.

When the cure controlling catalysts are employed in quantities below about 0.00005 mole per epoxide equivalent, either no catalytic effect or minimal catalytic effect at cure temperatures result.

When the cure controlling catalysts are employed in quantities above about 0.1 mole per epoxide equivalent, overcatalysis or undesirably shortened induction times at cure temperatures result.

EPOXY RESINS

The epoxy resins which can be employed to prepare the curable compositions of the present invention include essentially any epoxy-containing compound which contains an average of more than one vicinal epoxide group per molecule. The epoxide groups can be attached to any oxygen, sulfur or nitrogen atom or the single bonded oxygen atom attached to the carbon atom of a —CO—O— group in which said oxygen, sulfur or nitrogen atom or the carbon atom of the —CO—O— group is attached to an aliphatic, cycloaliphatic, polycycloaliphatic or aromatic hydrocarbon group which hydrocarbon group can be substituted with any inert substituent including, but not limited to, halogen atoms, preferably fluorine, bromine or chlorine, nitro groups, and the like or such groups can be attached to the terminal carbon atoms of a compound containing an average of more than one —(O—CHR$^a$—CHR$^a$)$_t$— group where each R$^a$ is independently hydrogen or an alkyl or haloalkyl group, containing from one to about 2 carbon atoms, with the proviso that only one R$^a$ group can be a haloalkyl group, and t has a value from one to about 100, preferably from one to about 20, mare preferably from one to about 10, most preferably from one to about 5. Preferably, the vicinal epoxide groups are glycidyl ether, glycidyl amine or glycidyl ester groups.

Suitable such epoxy resins which can be used to prepare the curable compositions of the present invention include, for example, the glycidyl ethers or glycidyl amines represented by any of the following general Formulas I, II, III, IV, V, VI, VII, VIII, IX or X

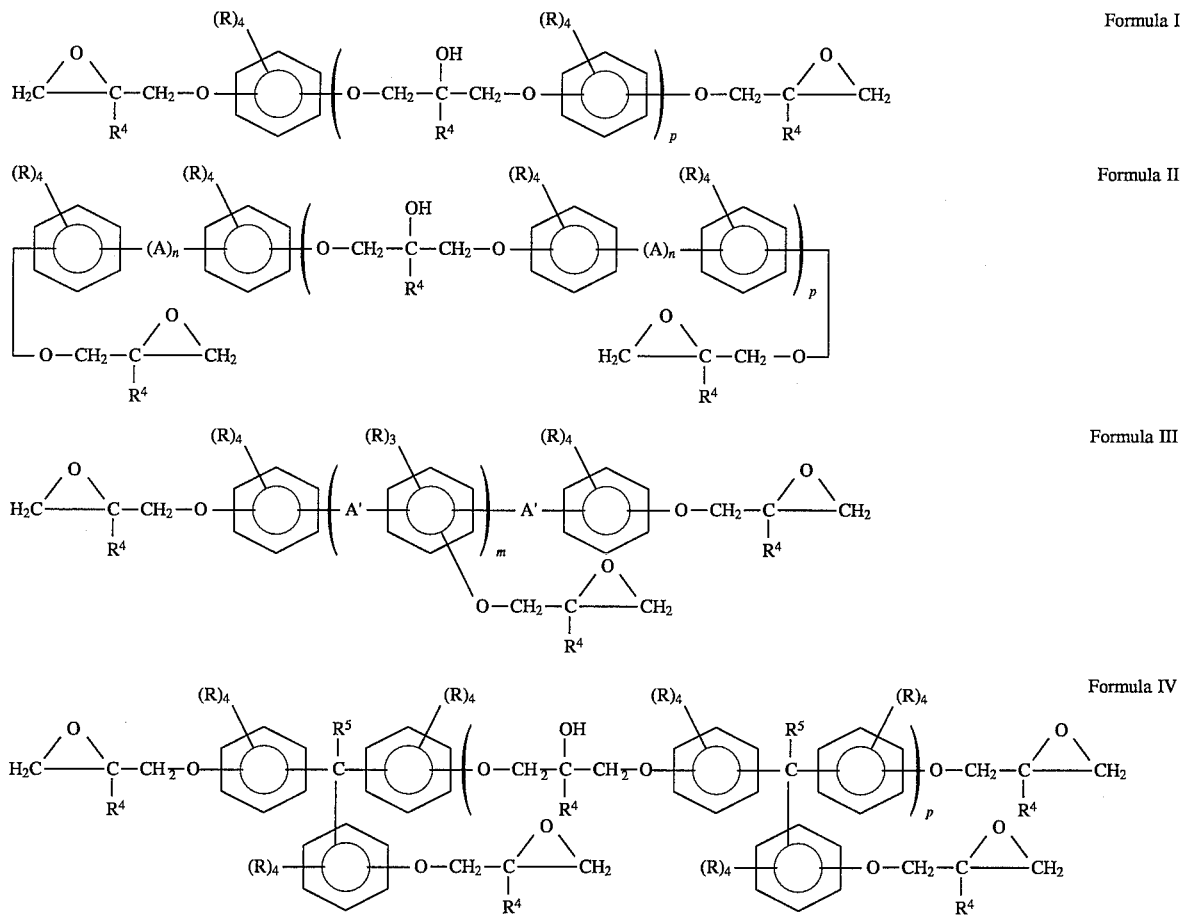

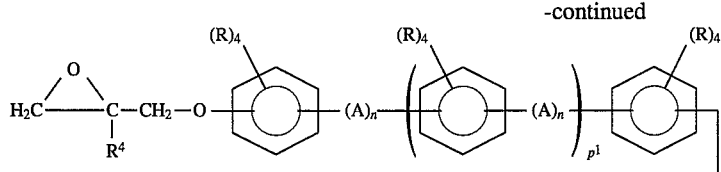

Formula V

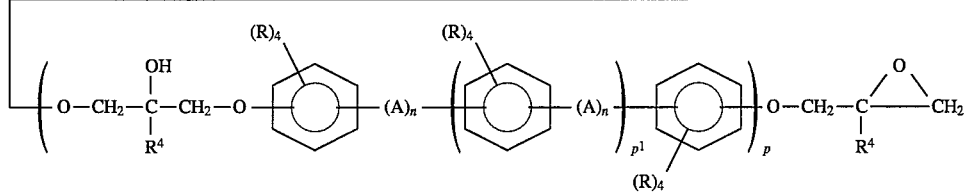

Formula VI

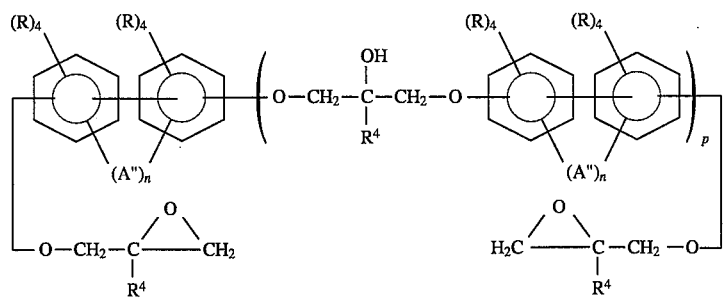

Formula VII

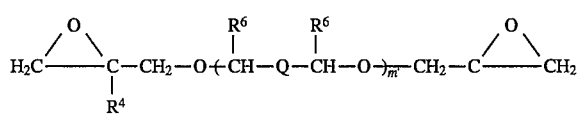

Formula VIII

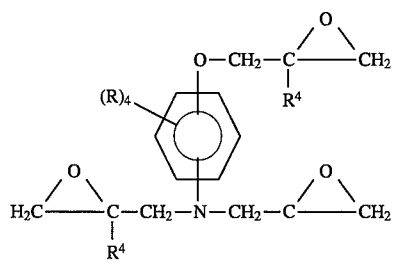

Formula IX

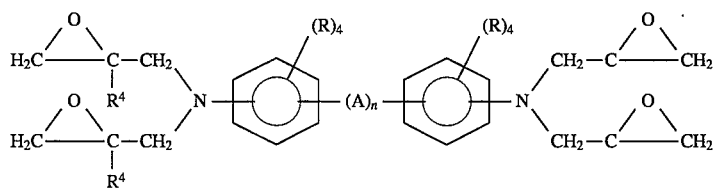

Formula X

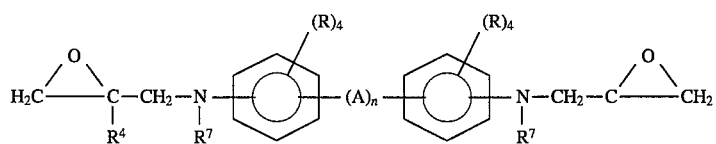

wherein each R is independently hydrogen or a monovalent hydrocarbyl or hydrocarbyloxy group having from one to about 10, preferably one to about 4, carbon atoms, a halogen atom, preferably chlorine, bromine or fluorine, a nitro group, a nitrile group or a —CO—$R^2$ group; $R^2$ is hydrogen or a monovalent hydrocarbyl group having from one to about 10, preferably one to about 2, carbon atoms; n has a value of zero or one; each A is independently a direct single bond, a divalent hydrocarbyl group having from one to about 20, preferably from one to about 6, carbon atoms, —O—, —CO—, —SO—, —$SO_2$—, —S—, —S—S—, —$CR^1$=$CR^1$—, —C≡C—, —N=N—, —$CR^1$=N—, —N=$CR^1$—, —O—CO—, —CO—O—, —S—CO—, —CO—S—, —$NR^1$—CO—$CR^1$=$CR^1$—, —$CR^1$=$CR^1$—CO—, —$CR^1$=N—O—OC—, —CO—O—N=$CR^1$—, —CO—$NR^1$—$NR^1$—OC—, —$CR^1$=$CR^1$—O—OC—, —CO—O—$CR^1$=$CR^1$—, —O—CO—$CR^1$=$CR^1$—, —$CR^1$=$CR^1$—CO—O—, —$(CHR^1)_n$—O—CO—$CR^1$=$CR^1$—, —$CR^1$=$CR^1$—CO—O—$(CHR^1)_n$—, —$(CHR^1)_n$—CO—O—$CR^1$=$CR^1$—, —$CR^1$=$CR^1$—O—CO—$(CHR^1)_n$—, —$CH_2$—$CH_2$—CO—O—, —O—OC—$CH_2$—$CH_2$—, —C≡C—C≡C—, —$CR^1$=$CR^1$—$CR^1$=$CR^1$—, —$CR^1$=$CR^1$—C≡C—, —C≡C—$CR^1$=$CR^1$—, —$CR^1$=$CR^1$—$CH_2$—O—OC—, —CO—O—$CH_2$—$CR^1$=$CR^1$—, —O—CO—C≡C—CO—O—, —O—CO—$CR^1$=$CR^1$—CO—O—, —O—CO—$CH_2$—$CH_2$—CO—O—, —S—CO—$CR^1$=

—CR¹—CO—S—, —CO—CH₂—NH—CO—, —CO—NH—CH₂—CO—, —NH—C(—CH₃)=CH—CO—, —CO—CH=C(—CH₃)—NH—, —CR¹=C(—Cl)—, —C(—Cl)=CR¹—, —CR¹=C(—CN)—, —C(—CN)=CR¹—, —N=C(—CN)—, —C(—CN)=N—, —CR¹=C(—CN)—CO—O—, —O—CO—C(—CN)=CR¹—,
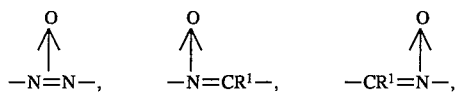
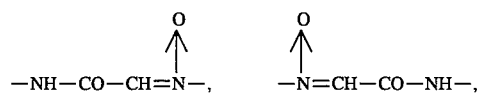
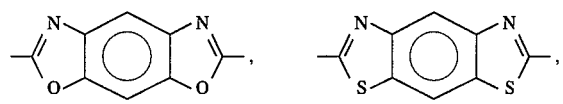
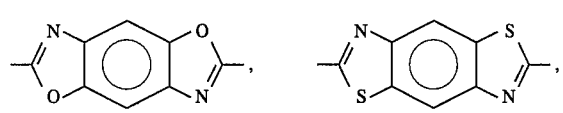
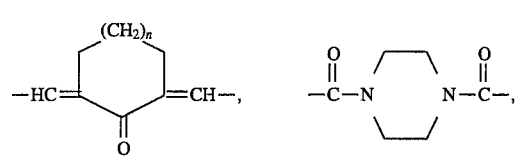
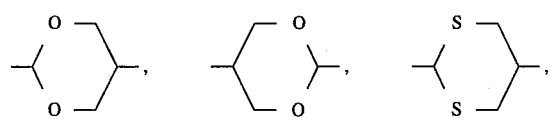
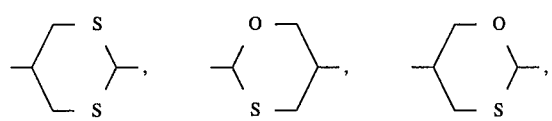
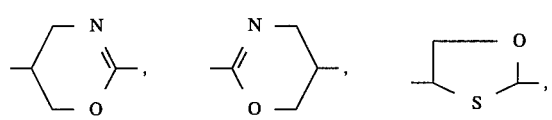
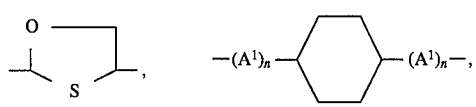
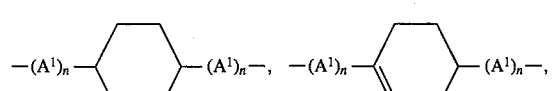
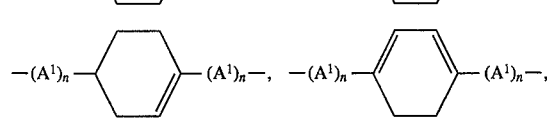
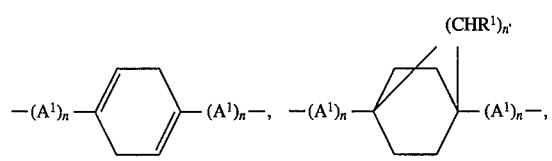
-continued
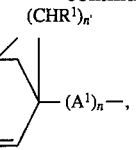
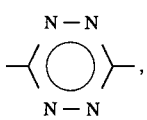
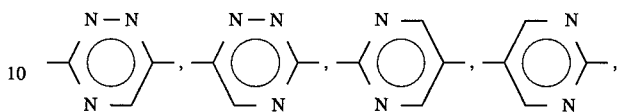
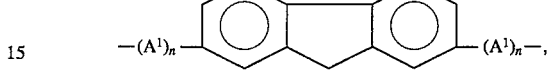
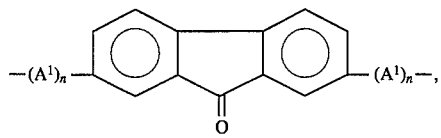
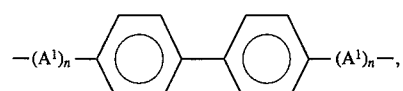
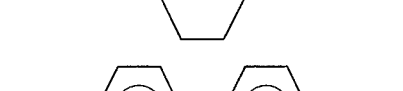
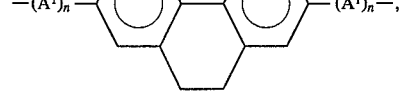
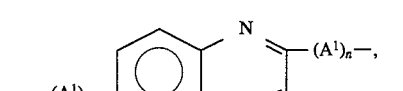
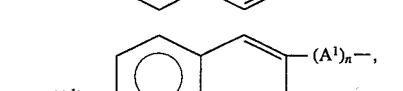
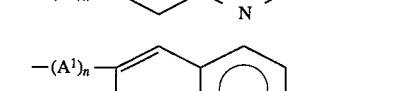
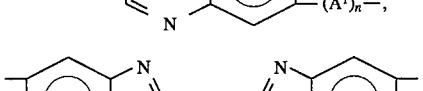
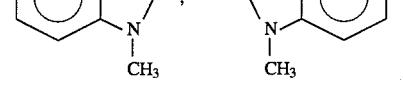
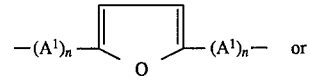

each A' is independently a divalent hydrocarbyl group having from one to about 10, preferably from one to about 4, carbon atoms; A" is a divalent hydrocarbyl group having from one to about 6, preferably from one to about 2, carbon atoms; each $A^1$ is independently a —CO—, —O—CO—, —CO—O—, —CO—S—, —S—CO—, —CO—NR$^1$— or —NR1—CO—; each $R^1$ is independently hydrogen or a monovalent hydrocarbyl group having from one to about 6 carbon atoms, and is preferably hydrogen or a hydrocarbyl group containing one carbon atom; each $R^4$ is independently hydrogen or a monovalent hydrocarbyl group having from one to about 3 carbon atoms; each $R^5$ is independently hydrogen, a monovalent hydrocarbyl group having from one to about 10, preferably from one to about 3, carbon atoms or a halogen atom, preferably chlorine or bromine; each $R^6$ is independently hydrogen or a monovalent hydrocarbyl or halohydrocarbyl group having from one to about 6, preferably one to about 2 carbon atoms; each $R^7$ is independently a monovalent hydrocarbyl group having from one to about 6, preferably from one to about 2 carbon atoms; Q is a direct bond, —CH$_2$—S—CH$_2$—, —(CH$_2$)$_{n''}$ —, or

m has a value from about 0.001 to about 6, preferably from about 0.01 to about 3; m' has a value from one to about 10, preferably from one to about 4; n' has a value of one or two, n" has an average value of from about one to about 10; p has a value from zero to about 30, preferably from zero to about 5 and $p^1$ has a value of from one to about 30, preferably from one to about 3. The aromatic rings in Formulas I, II, III, IV, V, VI, VIII, IX and X can also contain one or more heteroatoms selected from N, O, and S. The term "hydrocarbyl", when applied to the A" group of Formula VI, can also include one or more heteroatoms selected from N, O and S. Thus, A" can be, for example, the —CO— or —CH$_2$—O—CH$_2$— group.

Mesogenic epoxy resins include those represented by Formulas II, V, VI and IX wherein each A is independently selected from the aforementioned listing, but with the proviso that the A group is other than: a single bond, a divalent hydrocarbyl group having from one to 20 carbon atoms, —O—, —CO—, —SO—, —SO$_2$—, —S— or —S—S—; and with the proviso that at least 80 percent of the molecules making up the epoxy resin are para substituted with respect to the bridging groups (—A—) in Formulas II, V, IX and by the direct bond in Formula VI, the substituent containing the glycidyl group(s),

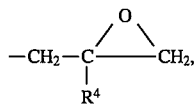

and the substituent containing the secondary hydroxyalkylidene group(s), —CH$_2$—C(OH)(R$^4$)—CH$_2$—, which are present when p or $p^1$ has a value greater than zero.

Representative epoxy resins which are substantially free of rodlike mesogenic moieties include, for example, the diglycidyl ethers of: resorcinol, hydroquinone, 4,4'-isopropylidenediphenol (bisphenol A), 4,4'-dihydroxydiphenylmethane, 4,4'-dihydroxybenzophenone, 3,3'5,5'-tetrabromo-4,4'-isopropylidenediphenol, 4,4'-thiodiphenol, 4,4'-sulfonyldiphenol, 4,4'-dihydroxydiphenyl oxide, 1,1-bis(4-hydroxyphenyl)-1-phenylethane, 3,3',5,5'-tetrachloro-4,4'-isopropylidenediphenol A, 3,3'-dimethoxy-4,4'-isopropylidenediphenol, dipropylene glycol, poly(propylene glycol), thiodiglycol; the triglycidyl ether of tris(hydroxyphenyl)methane; the polyglycidyl ethers of a phenol or alkyl or halogen substituted phenolaldehyde acid catalyzed condensation product (novolac resins); the tetraglycidyl amines of: 4,4'-diaminodiphenylmethane or 4,4 ' diaminodiphenylsulfone; the polyglycidyl ether of the condensation product of a dicyclopentadiene or an oligomer thereof and a phenol or alkyl or halogen substituted phenol; the advancement reaction products of the aforesaid di and polyglycidyl ethers with aromatic di and polyhydroxyl or carboxylic acid containing compounds including, for example hydroquinone, resorcinol, catechol, 2,4-dimethylresorcinol, 4-chlororesorcinol, tetramethylhydroquinone, 4,4'-isopropylidenediphenol (bisphenol A), 4,4'-dihydroxydiphenylmethane, 4,4'-thiodiphenol, 4,4'-sulfonyldiphenol, 2,2'-sulfonyldiphenol, 4,4'-dihydroxydiphenyl oxide, 4,4'-dihydroxybenzophenone, 1,1-bis(4-hydroxyphenyl)-1-phenylethane, 4,4'-bis(4(4-hydroxyphenoxy)phenylsulfone)diphenyl ether, 4,4'-dihydroxydiphenyl disulfide, 3,3',3,5'-tetrachloro-4,4'-isopropylidenediphenol, 3,3',3,5'-tetrabromo-4,4'-isopropylidenediphenol, 3,3'-dimethoxy-4,4'-isopropylidenediphenol; 1,1'-bis(4-hydroxyphenyl)cyclohexane, phloroglucinol, pyrogallol, 2,2', 5,5'-tetrahydroxydiphenyl sulfone, tris(hydroxyphenyl)-methane, dicyclopentadiene diphenol, tricyclopentadiene diphenol, terephthalic acid, isophthalic acid, adipic acid; or any combination of the aforementioned epoxy resins and the like.

Representative epoxy resins which contain rodlike mesogenic moieties include, for example, the diglycidyl ethers of: 4,4'-dihydroxy-alpha-methylstilbene, 4,4'-dihydroxybenzanilide, 4,4'-dihydroxyazoxybenzene, 4,4'-dihydroxybiphenyl, 4,4'-dihydroxydiphenylazemethine, 4,4'-dihydroxydiphenylacetylene, 4,4'-dihydroxystilbene, 4,4'-dihydroxy-alphacyanostilbene, 4,4'-dihydroxyazobenzene, 4,4'-dihydroxyazoxybenzene, 4,4'-dihydroxychalcone, 4-hydroxyphenyl-4-hydroxybenzoate; the tetraglycidyl amines of: 4,4'-diaminostilbene, N,N'-dimethyl-4,4'-diaminostilbene, 4,4'-diaminobenzanilide, 4,4'-diaminobiphenyl, 4,4'-diamino-alphamethylstilbene; the advancement reaction products of the aforesaid di and polyglycidyl ethers with aromatic di and polyhydroxyl or carboxylic acid containing compounds including, for example 4,4'-dihydroxybiphenyl, 4,4'-dihydroxy-alpha-methylstilbene, 4,4'-dihydroxybenzanilide, bis(4-hydroxyphenyl)terephthalate, N,N'-bis(4-hydroxyphenyl)terephthalamide, bis(4'-hydroxybiphenyl)terephthalate, 4,4'-dihydroxyphenylbenzoate, bis(4'-hydroxyphenyl)-1,4-benzenediimine; 4,4'-benzanilidedicarboxylic acid, 4,4'-phenylbenzoatedicarboxylic acid, 4,4'-stilbenedicarboxylic acid; or any combination of the aforementioned epoxy resins and the like.

These epoxy resins can be prepared generally by reacting a compound containing an average of more than one active hydrogen atom per molecule such as a compound containing an average of more than one primary or secondary amine group, carboxyl group, aliphatic, cycloaliphatic or aromatic hydroxyl group with an epihalohydrin in the presence of a suitable catalyst and in the presence or absence of a suitable solvent at a temperature suitably from about 0° C. to about 100° C., more suitably from about 20° C. to about 80° C., most suitably from about 20° C. to about 65° C.; at pressures suitably from about 30 mm Hg vacuum to about 100 psia., more suitably from about 30 Hg vacuum to about 50 psia., most suitably from about 60 mm Hg vacuum to about atmospheric pressure; for a time sufficient to complete the reaction, usually from about 0.5 to about 24, more usually from about 1 to about 12, most usually from about 1 to about 8 hours; and using from about 1.5:1 to 100:1, preferably from about 2:1 to about 50:1, most preferably from about 3:1 to about 20:1 moles of epihalohydrin per hydroxyl group. This initial reaction, unless the catalyst is an alkali metal or alkaline earth metal hydroxide employed in stoichiometric quantities, produces a halohydrin intermediate which is then reacted with a basic acting substance to convert the vicinal halohydrin groups to epoxide groups. The resultant product is a glycidyl compound. When the active hydrogen compound contains a hydroxyl group, the resultant product is a glycidyl ether; when the active hydrogen compound contains an amine group, the resultant product is a glycidyl amine; and when the active hydrogen compound contains a carboxyl group, the resultant product is a glycidyl ester.

Advancement reaction of di- and polyglycidyl compounds can be performed by known methods which usually includes combining one or more suitable compounds having an average of more than one active hydrogen atom per molecule, including, for example, dihydroxy aromatic, dithiol or dicarboxylic acid compounds or compounds containing one primary amine or amide group or two secondary amine groups and the di- or polyglycidyl compunds in the presence or absence of a suitable solvent with the application of heat and mixing to effect the advancement reaction. The epoxy resin and the compound having more than one active hydrogen atom per molecule are reacted in amounts which provide suitably from about 0.01:1 to about 0.95:1, more suitably from about 0.05:1 to about 0.8:1, most suitably from about 0.10:1 to about 0.5:1 active hydrogen atoms per epoxy group. The advancement reaction can be conducted at atmospheric, superatmospheric or subatmospheric pressures at temperatures of from about 20° C. to about 260° C., more suitably from about 80° C. to about 240° C., most suitably from about 100° C. to about 200° C. The time required to complete the advancement reaction depends upon the temperature employed. Higher temperatures require shorter periods of time whereas lower temperatures require longer periods of time. Generally, times of from about 5 minutes to about 24 hours, more suitably from about 30 minutes to about 8 hours, most suitably from about 30 minutes to about 4 hours are employed. A catalyst, including, for example, phosphines, quaternary ammonium compounds, phosphonium compounds and tertiary amines, is frequently added to facilitate the advancement reaction and is usually employed in quantities of from about 0.01 to about 3, preferably from about 0.03 to about 1.5, most preferably from about 0.05 to about 1.5 percent by weight based upon the weight of the epoxy resin.

Also suitable as the epoxy resins are the compounds containing a thiirane

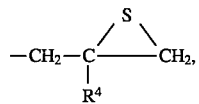

group which correspond to those compounds containing the glycidyl,

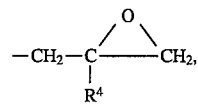

group.

CURABLE COMPOSITIONS

The curable compositions of the present invention are prepared by mixing together one or more epoxy resins and one or more curing agents for epoxy resins, one or both of which contain mesogenic moieties, and one or more cure controlling catalysts. For epoxy resins and/or curing agents which are solids, frequently, it is convenient to first melt the epoxy resin, then dissolve the curing agent therein followed by addition of the cure controlling catalyst. It is also operable to melt the curing agent then dissolve the epoxy resin therein followed by addition of the cure controlling catalyst, although this is generally less preferred.

The curing agents are employed in amounts which will effectively cure the curable mixture, with the understanding that these amounts will depend upon the particular curing agent and epoxy resin employed. Generally, suitable amounts are from about 0.80:1 to about 1.50:1, preferably from about 0.95:1 to about 1.05:1 equivalents of curing agent per equivalent of epoxide group in the epoxy resin at the conditions employed for curing.

The curing of the curable compositions of the present invention can be conducted at atmospheric, supersatmospheric or subatmospheric pressures at temperatures of from about 0° C. to about 300° C., preferably from about 50° C. to about 240° C., more preferably from about 150° C. to about 220° C. The time required to complete curing depends upon the temperature employed. Higher temperatures require shorter periods of time whereas lower temperatures require longer periods of time.

Generally, however, times of from about one minute to about 48 hours, preferably from about 15 minutes to about 8 hours, more preferably from about 30 minutes to about 3 hours are suitable.

CURING AGENTS

Suitable curing agents which can be used to prepare the curable compositions of the present invention include, for example, aliphatic, cycloaliphatic, polycycloaliphatic or aromatic primary monoamines; aliphatic, cycloaliphatic, polycycloaliphatic or aromatic primary and secondary polyamines; carboxylic acids and anhydrides thereof; aromatic hydroxyl containing compounds; imidazoles; guanidines; urea-aldehyde resins; melamine-aldehyde resins; alkoxylated urea-aldehyde resins; alkoxylated melamine-aldehyde resins; amidoamines; epoxy resin adducts all, none, or a part of which may contain one or more mesogenic moieties; combinations thereof and the like. Particularly suitable curing agents which do not include mesogenic moieties include, for example, methylenedianiline, dicyandiamide, ethylene diamine, diethylenetriamine, triethylenetetramine, tetraethylenepentamine, urea-formaldehyde resins, melamine-formaldehyde resins, methylolated urea-formaldehyde resins, methylolated melamine-formaldehyde resins, phenol-formaldehyde novolac resins, cresol-formaldehyde novolac resins, sulfanilamide, diaminodiphenylsulfone, diethyltoluenediamine, t-butyl-toluenediamine, bis-4-aminocyclohexylamine, isophoronediamine, diaminocyclohexane, hexamethylenediamine, piperazine, aminoethylpiperazine, 2,5-dimethyl-2,5-hexanediamine, 1,12-dodecanediamine, tris-3-aminopropylamine, combinations thereof and the like. Particularly suitable curing agents which contain mesogenic moieties include, for example, 4,4'-diaminostilbene, 4,4'-diamino-alpha-methylstilbene, 4,4'-diaminobenzanilide, 4,4'-bis(amino-phenoxy)-alpha-methylstilbene, 4,4'-dihydroxy-alpha-methylstilbene, 4,4'-dihydroxy-alpha-cyanostilbene, 4,4'-dihydroxystilbene, 4,4'-dihydroxy-2,2'-dimethylazoxybenzene, 4,4'-dihydroxy-α,α'-diethylstilbene, 4,4'-dihydoxybenzanilide, 4,4"-dihydroxybiphenylbenzoate, bis(4-hydroxyphenyl)terephthalate, bis(N,N'-4-hydroxyphenyl)terephthalamide, bis(4'-dihydroxybiphenyl)terephthalate, 4,4'-dihydroxyphenylbenzoate, 1,4-bis(4'-hydroxyphenyl-1'-carboxamide)benzene, 1,4-bis(4'-hydroxyphenyl-40'-carboxy)benzene, 4,4'-bis(4'-hydroxyphenyl-1"-carboxy)biphenyl, bis(4'-hydroxyphenyl)-1,4-benzenediamine, 4,4'-benzanilide dicarboxylic acid, 4,4'-phenylbenzoate dicarboxylic acid, 4,4'-stilbene dicarboxylic acid, or any combination thereof and the like.

AMOUNT OF COMPONENT(S) CONTAINING MESOGENIC MOIETIES

The amounts of mesogenic moiety required to improve one or more properties of the cured products resulting from the curable compositions of the present invention vary substantially and depend upon the particular chemical structure of the mesogenic moiety or moieties used, the aspect ratio of the mesogenic moiety or moieties used, the cure temperature(s) used, the cure time(s) used, and other such variables. Usually the amount of components containing a mesogenic moiety in the curable compositions are preferably from about 5 percent to 100 percent, more preferably from about 10 percent to 100 percent, most preferably from about 20 percent to 100 percent of the epoxy and/or thiirane resins and components reactive with an epoxide or thiirane group employed in the composition.

B-STAGING (PARTIAL CURING).

It is also operable to partially cure (B-stage) the curable compositions of the present invention and then complete the curing at a later time. B-staging can be accomplished by heating at a temperature for such a time that only partial curing is produced. Usually, the cure temperatures are employed for B-staging, however, for a shorter period of time. Generally, the extent of B-staging is monitored using analytical methods such as viscosity measurement, differential scanning calorimetry for residual cure energy or infrared spectrophotometric analysis for unreacted curable functional groups.

It is frequently of value to "B-stage" the curable compositions of this invention in order to chain extend the resin. This chain extension is required for some mesogen-containing curable compositions in order to achieve liquid crystal character. B-staging can also be employed to increase the temperature range at which a particular curable composition is liquid crystalline and to control the degree of crosslinking during the final curing stage.

ORIENTATION

As a result of the mesogenic moieties being present in one or more of the components of the curable compositions of the present invention, electric or magnetic fields, drawing and/or shear stresses can be applied before and/or during processing and/or curing for the purpose of orienting the liquid crystal phase contained or developed therein. The effect of this orientation is an improvement in mechanical properties. As specific examples of these methods, Finkelmann, et al, *Macromol. Chem.*, volume 180, pages 803–806 (March, 1979) induced orientation in thermotropic thermoplastic methacrylate copolymers containing mesogenic side chain groups decoupled from the main chain via flexible spacers in an electric field. Within the nematic liquid crystalline transition temperature range for one of the copolymers, homeotropic orientation was achieved with a half-time of approximately 10 seconds at 8 volts d.c. At higher voltages, turbulent flow disrupted the homeotropic orientation. A second copolymer within the nematic liquid crystalline transition temperature range gave reversible homeotropic orientation with an orientation time of less than 200 mseconds in a 50 Hz d.c. electric field. Threshold voltage was approximately 6 volts and the relaxation half-time was approximately 5 seconds. Thus, for the orientation of the curable blends of the present invention which contain or develop liquid crystal moieties, it is frequently of value to conduct simple preliminary experiments over the range of experimental conditions to be employed, including voltage to be applied and time to be used for application of the voltage to a given mesophase at a given temperature. In this manner, an indication of the critical electric field strength, orientation time and relaxation time for the mesophase to be oriented can be obtained and conditions not conducive to orientation, such as flow instability, can be avoided. Orientation of mesogenic side chain groups decoupled from the thermoplastic polymer main chain via flexible spacers in a magnetic field has been demonstrated by Roth and Kruecke, *Macromol. Chem.*, volume 187, pages 2655–2662 (November, 1986). Within the broad temperature range of approximately −120° C. to 200° C., orientation of the polymers was observed (anisotropy in the motional processes as shown by change in line width of proton magnetic resonance signals as a function of temperature). In order to achieve macroscopic orientation in a magnetic field of about 2 T it was found that the choice of proper temperature is important such that the ordering effect of the magnetic field overcomes the disordering effect of thermal motion and that sufficient molecular mobility is present to allow for the ordering to occur. Furthermore, this proper temperature was found to vary as a function of the particular mesogen-containing polymer to be oriented. Thus, for the orientation of the curable blends of the present invention which contain or develop liquid crystal moieties, it is frequently of value to conduct simple preliminary experiments over the range of experimental conditions to be employed, including the magnetic field to be applied and time to be used for application of the magnetic field to a given mesophase at a given temperature. In this manner, an indication of the critical magnetic field strength, orientation time and relaxation time for the mesophase to be oriented can be obtained and conditions not conducive to orientation, such as improper temperature range, can be avoided. Magnetic field induced orientation of mesogenic main chain containing thermoplastic polymers has been demonstrated by Moore, et al, *ACS Polymeric Materials Sciences and Engineering*, volume 52, pages 84–86 (April-May, 1985). At the melt temperature for the liquid crystalline thermoplastic copolymer of p-hydroxybenzoic acid (80%) and polyethylene terephthalate (20%) the threshold for orientation was found to be approximately 0.4 T, with the degree of orientation (order parameter) depending on the strength of the magnetic field. Relaxation of the orientation once the polymer is removed from the magnetic field depends on the amount of time that the polymer spent in the magnetic field. Thus, for the liquid crystalline thermoplastic polymer maintained in a 6.3 T magnetic field, maximum relaxation time was approximately 15 minutes, while the liquid crystalline thermoplastic polymer maintained in a 2 T or less magnetic field exhibited a maximum relaxation time of less than one minute. An equation delineating the balance between the ordering effect of the magnetic field and the disordering effect of thermal motion is given for domains of radius a as follows:

$$X_a \cdot Ht^2 \cdot a^2 = kT/a$$

where Ht is the threshold magnetic field and $X_a$ is the difference between the magnetic susceptibilities of the polymer when aligned parallel and perpendicular to the field. Magnetic and electric field orientation of low molecular weight mesogenic compounds is discussed by W. R. Krigbaum in *Polymer Liquid Crystals*, pages 275–309 (1982) published by Academic Press, Inc.

In addition to orientation by electric or magnetic fields, polymeric mesophases can be oriented by shear forces, for example, using shear rates as low as 0.1 sec$^{-1}$ to as high as 10,000 sec$^{-1}$, which are induced by drawing and/or flow through dies, orifices and mold gates. A general discussion for orientation of thermotropic liquid crystal polymers by this method is given by S. K. Garg and S. Kenig in *High Modulus Polymers*, pages 71–103 (1988) published by Marcel Dekker, Inc. and S. Keneg, *Polymer Engineering and Science*, volume 29, number 16, pages 1136–1141 (August, 1989). For the orientation by shear forces of the curable blends of the present invention which contain or develop liquid crystal moieties, it is frequently of value to conduct simple preliminary experiments over the range of experimental conditions to be employed, including total shear strain to be applied and time to be used for application of the shear force to a given mesophase at a given temperature. In this manner, an indication of the critical total shear strain, orientation time and relaxation time for the mesophase to be oriented can be obtained and conditions not conducive to orientation, such as tumbling of domain structure, can be avoided. For the mesomorphic systems based on using latent catalysts, this shear orientation can be produced by processing methods such as injection molding, extrusion, pultrusion, filament winding, filming and prepreging. All of the aforementioned periodicals and books are incorporated herein by reference in their entirety.

OTHER COMPONENTS

The curable compositions of the present invention can be blended with other materials such as solvents or diluents, fillers, pigments, dyes, flow modifiers, thickeners, reinforcing agents, mold release agents, wetting agents, stabilizers, fire retardant agents, surfactants or any combination thereof and the like.

These additives are added in functionally equivalent amounts, e.g., the pigments and/or dyes are added in quantities which will provide the composition with the desired color; however, they are suitably employed in amounts of from about zero to about 20, more suitably from about 0.5 to about 5, most suitably from about 0.5 to about 3 percent by weight based upon the weight of the total blended compositions.

Solvents or diluents which can be employed herein include, for example, hydrocarbons, ketones, glycol ethers, aliphatic ethers, cyclic ethers, esters, amides, combinations thereof and the like. Particularly suitable solvents or diluents include, for example, toluene, xylene, methylethylketone, methylisobutylketone, diethylene glycol methyl ether, dipropylene glycol methyl ether, dimethylformamide, N-methylpyrrolidinone, tetrahydrofuran, dioxane, propylene glycol methyl ether or any combination thereof and the like.

The modifiers such as thickeners, flow modifiers and the like can be suitably employed in amounts of from zero to about 10, more suitably from about 0.5 to about 6, most suitably from about 0.5 to about 4 percent by weight based upon the weight of the total composition.

Reinforcing materials which can be employed herein include natural and synthetic fibers in the form of woven fabric, mats, monofilament, multifilament, unidirectional fibers, rovings, random fibers or filaments, inorganic fillers or whiskers, hollow spheres, and the like. Suitable reinforcing materials include glass, ceramics, nylon, rayon, cotton, aramid, graphite, polyalkylene terephthalates, polyethylene, polypropylene, polyesters or any combination thereof and the like.

Suitable fillers which can be employed herein include, for example, inorganic oxides, ceramic microspheres, plastic microspheres, glass microspheres, inorganic whiskers, calcium carbonate or any combination thereof and the like.

The fillers can be employed in amounts suitably from about zero to about 95, more suitably from about 10 to about 80, most suitably from about 40 to about 60 percent by weight based upon the weight of the total composition.

UTILIZATION

The curable compositions of the present invention can be employed in coating, casting, encapsulation, electronic or structural laminate or composite, filament winding, molding, and the like applications.

The following examples are illustrative of the present invention, but are not to be construed as to limiting its scope in any manner.

COMPARATIVE EXPERIMENT A

Preparation of a Cured Epoxy Resin Containing Non-mesogenic Moieties (Not an Example of the Present Invention)

A. Preparation of B-Staged Resin

The following components are added to a 12 liter round bottom flask and heated to 150° C.:
1. Diglycidyl ether of bisphenol A —2863.41 grams (EEW= 174.0; 16.456 epoxide equiv.),
2. A 2.2 functional epoxy resin having a dicyclopentadiene backbone— 3702.69 grams (EEW=225.0; 16.456 epoxide equivalents),
3. A 3.6 functional phenol/formaldehyde novolac resin— 1711.46 grams (—OH equiv. wt.=104.0; 16.456 phenolic equiv.),
4. Tetrabromobisphenol A—3580.91 grams (—OH equiv. wt.=272.0; 13.165 phenolic equiv.).

At 150° C., 141.52 grams of sulfanilamide (amine hydrogen equiv. wt.=43.0525; 3.291 amine hydrogen equiv.) is added. After 30 minutes of stirring, the resin is cooled to 100° C. and 62.07 milliliters (0.0717 mole; 0.00178 mole of catalyst per epoxide group) of a 40 weight percent solution of tetra-n-butylphosphonium fluoroborate (422.5 molecular weight) in methanol is added. The methanol is then removed from the resin by applying a vacuum to the round bottom flask and externally collecting the vapors obtained. The resultant B-staged resin is then poured from the flask and allowed to cool to room temperature.

B. Curing of B-Staged Resin

For the preparation of a cured composition, 115 grams of the B-staged resin prepared in A above is heated to 150° C. After heating to 150° C., the resin is poured into a 7.5 inch ×7.0 inch × 0.125 inch (19.05 cm ×17.78 cm ×0.3175 cm) glass mold preheated to 150° C. The cure schedule used for the resin consists of 4 hours at 150° C., 1 hour at 175° C. and 2 hours at 200° C. The casting obtained is then cooled to room temperature and removed from the mold for evaluation. The resultant cured product has the properties reported in Table I.

EXAMPLE I

Preparation of a Cured Epoxy Resin Composition Containing the Diglycidyl Ether of 4,4'-Dihydroxy-alpha-methylstilbene A. Preparation of B-Staged Resin The following components are combined and heated to 150° C. on a hot plate:
1. Diglycidyl ether of 4,4'-dihydroxy-alpha-methylstilbene —31.25 grams — (EEW=176.6; 0.177 epoxide equiv.),
2. Diglycidyl ether of bisphenol A —15.40 grams (EEW= 174.0; 0.088 epoxide equiv.),
3. A 2.2 functional epoxy resin having a dicyclopentadiene backbone — 19.91 grams (EEW=225; 0.088 epoxide equiv.),
4. A 3.6 functional phenol/formaldehyde novolac resin —18.41 grams (—OH equiv. wt.=104.0; 0.177 phenolic equiv.),
5. Tetrabromobisphenol A —38.51 grams (-OH equiv. wt.= 272.0; 0.141 phenolic equiv.),
6. Sulfanilamide —1.52 grams (amine hydrogen equiv. wt.=43.0525; 0.035 amine hydrogen equiv.).

After heating to 150° C., the mixture is stirred until all the components have either melted or dissolved. The resin is then cooled to 140° C. and 0.67 milliliter (0.000774 mole; 0.00179 mole of catalyst per epoxide group) of a 40 weight percent solution of tetra-n-butylphosphonium fluoroborate (422.5 molecular weight) in methanol is added. After additional stirring, the methanol is removed from the B-staged resin by applying a vacuum using a bell jar.

B. Curing of B-Staged Resin

After the methanol is removed, as evidenced by no observable outgassing, the B-staged resin prepared in A. above is poured into a 7.5 inch ×7.0 inch ×0.125 inch (19.05 cm ×17.78 cm ×0.3175 cm) glass mold preheated to 150° C. The cure schedule used for the resin consists of 4 hours at 150° C., 1 hour at 175° C. and 2 hours at 200° C. The casting obtained using this cure schedule is then cooled to room temperature and removed from the mold for evaluation. The resultant cured product has the properties reported in Table I.

EXAMPLE 2

Preparation of a Cured Epoxy Resin Composition Containing the Diglycidyl Ether of 4,4'-Dihydroxy-alpha-methylstilbene and 4,4'-Dihydroxy-alpha-methylstilbene A. Preparation of B-Staged Resin The following components are combined and heated to 150° C. on a hot plate:
1. Diglycidyl ether of 4,4'-dihydroxy-alpha-methylstilbene —34.35 grams — (EEW=176.6; 0.195 epoxide equiv.),
2. Diglycidyl ether of bisphenol A —16.92 grams (EEW= 174.0; 0.097 epoxide equiv.),
3. A 2.2 functional epoxy resin having a dicyclopentadiene backbone — 21.88 grams (EEW=225; 0.097 epoxide equiv.),
4. A 3.6 functional phenol/formaldehyde novolac resin —20.23 grams (—OH equiv. wt.=104.0; 0.194 phenolic equiv.),
5. Tetrabromobisphenol A —21.16 grams (—OH equiv. wt.=272.0; 0.078 phenolic equiv.),
6. 4,4'-Dihydroxy-alpha-methylstilbene —8.79 grams (—OH equiv. wt.= 113.145; 0.078 phenolic equiv.),
7. Sulfanilamide —1.67 grams (amine hydrogen equiv. wt.=43.0525; 0.039 amine hydrogen equiv.).

After heating to 150° C., the mixture is stirred until all the components have either melted or dissolved. The resin is then cooled to 140° C. and 0.73 milliliters (0.000843 mole; 0.00178 mole of catalyst per epoxide group) of a 40 weight percent solution of tetra-n-butylphosphonium fluoroborate (422.5) molecular weight in methanol is added. After additional stirring, the methanol is removed from the B-staged resin by applying a vacuum using a bell jar.

B. Curing of B-Staged Resin

After the methanol is removed, as evidenced by no observable outgassing, the B-staged resin prepared in A. above is poured into a 7.5 inch ×7.0 inch ×0.125 inch (19.05 cm ×17.78 cm ×0.3175 cm) glass mold preheated to 150° C. The cure schedule used for the resin consists of 4 hours at 150° C., 1 hour at 175° C. and 2 hours at 200° C. The casting obtained using this cure schedule is then cooled to room temperature and removed from the mold for evaluation. The resultant cured product has the properties reported in Table I.

EXAMPLE 3

Preparation of a Cured Epoxy Resin Composition Containing the Diglycidyl Ether of 4,4'-Dihydroxy-alpha-methylstilbene and 4,4 '-Dihydroxy-alpha-methylstilbene A. Preparation of B-Staged Resin The following components are combined and heated to 160° C. in a forced air convection oven:
1. Diglycidyl ether of 4,4'-dihydroxy-alpha-methylstilbene —66.89 Grams — (EEW=178.1; 0.375 epoxide equiv.),
2. A 3.6 functional phenol/formaldehyde novolac resin —19.50 grams (—OH equiv. wt.=104.0; 0.187 phenolic equiv.),
3. 4,4'-Dihydroxy-alpha-methylstilbene —16.99 grams (—OH equiv. wt.= 113.145; 0.150 phenolic equiv.),
4. Sulfanilamide —1.62 grams (amine hydrogen equiv. wt.=43.0525; 0.038 amine hydrogen equiv.).

After heating to 160° C., the mixture is stirred until all the components have either melted or dissolved and 0.79 milliliters (0.000913 mole; 0.00199 mole of catalyst per epoxide group) of a 40 weight percent solution of tetra-n-butylphosphonium fluoroborate (422.5 molecular weight) in methanol is added. After additional stirring, the methanol is removed from the B-staged resin by applying a vacuum using a bell jar.

B. Curing of B-Staged Resin

After the methanol is removed, as evidenced by no observable outgassing, the B-staged resin prepared in A. above is poured into a 7.5 inch ×7.0 inch ×0.125 inch (19.05 cm ×17.78 cm ×0.3175 cm) glass mold preheated to 160° C., which is then cooled to 135° C. The cure schedule used for the resin consists of 3 hours at 135° C., 1 hour at 150° C., 1 hour at 175° C., and 2 hours at 200° C. The casting obtained using this cure schedule is cooled to room temperature and removed from the mold for evaluation. The resultant cured product has the properties reported in Table I.

EXAMPLE 4

Preparation of a Cured Epoxy Resin Composition Containing the Digylcidyl Ether of 4,4'-Dihydroxy-alpha-methylstilbene and 4.4'-Dihydroxy-alpha-methylstilbene

A. Preparation Of B-Staged Resin

The following components are combined and heated to 160° C. in a forced air convection oven:
1. Diglycidyl ether of 4,4'-dihydroxy-alpha-methylstilbene —66.10 grams — (EEW=178.1; 0.371 epoxide equiv.),
2. A 3.6 functional phenol/formaldehyde novolac resin —19.30 grams (—OH equiv. wt. = 104.0; 0.185 phenolic equiv.),
3. 4,4'-Dihydroxy-alpha-methylstilbene —20.99 grams (—OH equiv. wt.= 113.145; 0.185 phenolic equiv.).

After heating to 160° C., the mixture is stirred until all the components have either melted or dissolved. The resin is then cooled to 150° C. and 0.78 milliliters (0.000901 mole; 0.00199 mole of catalyst per epoxide group) of a 40 weight percent solution of tetra-n-butylphosphonium fluoroborate (422.5 molecular weight) in methanol is added. After additional stirring, the methanol is removed from the B-staged resin by applying a vacuum using a bell jar.

B. Curing of B-Staged Resin

After the methanol is removed, as evidenced by no observable outgassing, the B-staged resin prepared in A. above is poured into a 7.5 inch ×7.0 inch ×0.125 inch (19.05 cm×17.78 cm×0.3175 cm) glass mold preheated to 160° C., which is then cooled to 130° C. The cure schedule used for the resin consists of 3 hours at 130° C., 1 hour at 150° C., 1 hour at 175° C., and 4 hours at 200° C. The casting obtained using this cure schedule is cooled to room temperature and removed from the mold for evaluation. The resultant cured product has the properties reported in Table I.

TABLE I

| COMPONENTS & RESULTS | Comp. Expt A* | Ex. 1 | Ex. 2 | Ex. 3 | Ex. 4 |
|---|---|---|---|---|---|
| Equivalents of phneolic —OH per Equivalent of Epoxy Used in Composition | 0.9 | 0.9 | 0.9 | 0.9 | 1.0 |
| Equivalents of Sulfanilamide —NH per Equivalent of Epoxy Used in Composition | 0.1 | 0.1 | 0.1 | 0.1 | 0.0 |
| Weight Percent Diglycidyl Ether of 4,4'-Dihydroxy-alphamethylstilbene Used in Composition | 0 | 25.0 | 34.3 | 63.7 | 62.1 |
| Weight Percent 4,4'-Dihydroxy-alpha-methylstilbene Used in Composition | 0 | 0 | 8.79 | 16.2 | 19.7 |
| Casting Appearance | Translucent | Translucent | Translucent | Translucent | Translucent |
| Morphology of Cured Composition, Cross-polarized Light Microscopy (70X Magnification) | Non-Birefringent | Birefringent | Birefringent | Birefringent | Birefringent |
| Fracture Toughness ($G_{IC}$), joules/m$^2$ | 272 | 400 | 729 | 1197 | 1953 |
| Methyl Ethyl Ketone Absorption after 8 Hours Submersion at Room Temperature, Weight % | 7.6 | 1.2 | 1.0 | 0.2 | 0.4 |
| Glass Transition Temperature, °C. (Differential Scanning Calorimetry) | 139 | 143 | 137 | 139 | 125 |

*Not an example of the present invention.

TEST PROCEDURES:

Fracture Toughness

The method used for measuring fracture toughness or "critical energy release rate", ($G_{IC}$), is an adaption of ASTM E-399 for plastic materials from the original usage with metals. This test has widespread application in the measurement of toughness for plastic materials and is described in *J. Mater. Sci.*, Vol. 16, 2657, 1981, which is incorporated herein by reference in its entirety.

Methyl Ethyl Ketone Absorption

Weighed coupons (1.5 inch ×0.5 inch ×0.125 inch; 3.81 cm ×1.27 cm ×0.3175 cm) obtained from the castings prepared are submersed in methyl ethyl ketone. After 8 hours submersion at room temperature, the coupons are removed from the methyl ethyl ketone, wiped dry, and then reweighed. The methyl ethyl ketone absorption is then calculated from the weight gain observed after this exposure.

EXAMPLE 5

Preparation of a Cured Epoxy Resin Composition Containing the Diglycidyl Ether of 4,4'-Dihydroxy-alpha-methylstilbene and 4,4'-Dihydroxy-alpha-methylstilbene

A. Preparation of B-Staged Resin

The following components are combined and heated to 150° C. in a stirred, 2 liter resin kettle:
1. Diglycidyl ether of 4,4'-dihydroxy-alpha-methylstilbene —135.75 grams —(EEW=178.08; 0.762 epoxide equiv.),
2. A 3.6 functional phenol/formaldehyde novolac resin —39.64 grams (—OH equiv. wt. =104.0; 0.381 phenolic equiv.).

After heating to 150° C., 34.50 grams of 4,4'-dihydroxy-alphamethylstilbene (—OH equiv. wt. =113.145; 0.305 —OH equiv.) is added. After the 4,4'-dihydroxy-alpha-methylstilbene has dissolved (10 minutes after addition), the temperature of the resin is increased to 160° C. and 3.28 grams of sulfanilamide (amine hydrogen equiv. wt.=43.0525; 0.076 amine hydrogen equiv.) is added. After the sulfanilamide has dissolved (approximately 10 minutes after addition), the resin is cooled to 140° C. and 1.60 milliliters (0.00185 mole; 0.00199 mole of catalyst per epoxide group) of a 40 wt. percent solution of tetra-n-butylphosphonium fluoroborate (422.5 molecular weight) in methanol is added and the resultant mixture is stirred for 1 minute. The methanol is then removed from the B-staged applying a vacuum using a bell jar.

B. Curing of B-Staged Resin

After the methanol is removed, as evidenced by no observable outgassing, the B-staged resin prepared in A. above is poured into a 5.5 inch ×5.0 inch ×0.25 inch glass mold preheated to 150° C. The oven temperature is then reduced to 135° C. and the schedule used to cure the resin is 4 hours at 135° C. 1 hour at 150° C. 1 hour at 175° C. and 2 hours at 200° C. The casting obtained is cooled to room temperature and removed from the mold. From this casting, double-notch four-point bend specimens are prepared for the determination of fracture mechanisms. The double-notch four-point bending technique is described by H. -J. Sue and A. F. Yee in the "Study of fracture mechanisms of multiphase polymers using the double-notch four-point bending method", *Journal of Material Science*, volume 28 (1993), which is incorporated herein by reference in its entirety. The principle for this technique is as follows: two nearly identical cracks are cut using a notching cutter (250 microns in radius), followed by liquid nitrogen chilled razor blade tapping to wedge open the sharp cracks into the same edge of a rectangular beam (5 inches ×0.5 inches ×0.25 inches; 12.7 cm ×1.27 cm ×0.635 cm). This beam is then loaded in a four-point bending geometry with the cracks positioned on the tensile side. The portion of the beam between the two inner loading points is subjected to a constant bending moment using a Sintech 2 screw driven mechanical testing machine. Thus the two cracks experience nearly identical stresses. As load is applied (crosshead speed of the testing machine=0.2 inches,5.08 cm, per minute), plastic zones form in front of the crack tips. Since the two cracks cannot be exactly identical, one crack will propagate unstably, leaving behind the other crack with a nearly critically developed process zone at its tip. Since this crack is arrested, the events in the crack tip process are not obliterated and can be examined. When viewed by scanning electron micoscopy, the fracture surface produced by the cured resin composition containing the diglycidyl ether of 4,4'-dihydroxy-alpha-methylstilbene and 4,4'-dihydroxy-alpha-methylstilbene exhibits a rough, tendril-like appearance indicative of high toughness and ductility. By way of contrast, conventional epoxy resins, such as prepared in Comparative Example A, exhibit a smooth, glassy, featureless surface. Thin sectioning of the crack tip damage zone and microscopy are then applied to probe the fracture mechanisms which occur at the crack tip and its wake. In examinations of the crack tip damage zone using a JEOL 2000FX ATEM transmission electron microscope operating at an accelerating voltage of 100 kV, bridging regions of stretched polymer are observed within the crack, giving the crack a segmented appearance. This observation indicates that the toughness for this cured composition results from a high degree of plastic stretching which has occurred around the advancing crack tip. An observation made by optical microscopy is that the damage zone surrounding the crack is highly compact (approximately 30 microns) relative to the damage zone observed in other toughened epoxy resin systems such as, for example, rubber modified epoxy resin systems (damage zone=approximately 300 microns).

COMPARATIVE EXPERIMENT B

Preparation of a Curable Epoxy Resin Composition Containing the Diglycidyl Ether of 4,4'-Dihydroxy-alpha-methylstilbene and 4,4'-Dihydroxy-alpha-methylstilbene Using a Non-Cure Controlling Catalyst Preparation of B-Staged Resin 34.63 grams of the diglycidyl ether of 4,4'-dihydroxy-alpha-methylstilbene (EEW=179.337; 0.193 epoxide equiv.) is placed in a forced air convection oven preheated to 160° C. After this resin has been heated to 160° C., 8.74 grams of 4,4'-dihydroxy-alpha-methylstilbene (—OH equiv. wt.=113.145; 0.077 —OH equiv.) is added and periodic stirring of the mixture (every 3–4 minutes) is begun. After the 4,4'-dihydroxy-alphamethylstilbene has dissolved (25 minutes after addition to the resin), 4.99 grams of sulfanilamide (amine hydrogen equiv. wt.=43.0525; 0.116 amine hydrogen equiv.) is added and periodic stirring is continued. After the sulfanilamide has dissolved (9 minutes after addition to the resin),the resin is cooled to 120° C. After cooling the resin to 120° C. (16 minutes after the addition of the sulfanilamide to the resin), 0.22 milliliters (0.000412 mole; 0.00199 mole of catalyst per epoxide group) of a 70.9 wt. percent solution of tetra-n-butylphosphonium acetate-acetic acid complex (378.0 molecular weight) in methanol is added and the resultant mixture is continuously stirred for 1 minute. The methanol is then removed from the B-staged resin by applying a vacuum using a bell jar. After the methanol is removed, the B-staged resin is cooled to room temperature. Differential scanning calorimetry (DSC) analysis and viscosity data for this curable B-staged epoxy resin composition are given in Table II.

EXAMPLE 6

Preparation of a Cured Epoxy Resin Composition Containing the Diglycidyl Ether of 4,4'-Dihydroxy-alpha-methylstilbene and 4,4'-Dihydroxy-alpha-methylstilbene A. Preparation of B-Staged Resin 52.91 grams of the diglycidyl ether of 4,4'-dihydroxy-alphamethylstilbene (EEW=178.137; 0.297 epoxide equiv.) is placed in a forced air convection oven preheated to 160° C. After this resin has been heated to 160° C., 6.72 grams of 4,4,-dihydroxy-alpha-methylstilbene (—OH equiv. wt.= 113.145; 0.059 —OH equiv.) is added and periodic stirring of the mixture (every 3–4 minutes) is begun. After the 4,4'-dihydroxy-alpha-methylstilbene has dissolved (9 minutes after addition to the resin), 10.23 grams of sulfanilamide (amine hydrogen equiv. wt.=43.0525; 0.238 amine hydrogen equiv.) is added and periodic stirring is continued. After the sulfanilamide has dissolved (12 minutes after addition to the resin), 0.625 milliliters (0.000722 mole; 0.00199 mole of catalyst per epoxide group) of a 40 weight percent solution of tetra-n-butylphosphonium fluoroborate (422.5 molecular weight) in methanol is added and the resultant mixture is continuously stirred for 1 minute. The methanol is then removed from the B-staged resin by applying a vacuum using a bell jar.

B. Curing of B-Staged Resin

After the methanol is removed, as evidenced by no observable outgassing, the B-staged resin prepared in A. above is poured into a 7.0 inch ×7.0 inch ×0.125 inch (17.78 cm ×17.78 cm ×0.3175 cm) glass mold preheated to 150° C. The schedule used to cure the resin is 4 hours at 150° C., 1 hour at 175° C. and 4 hours at 200° C. The casting obtained using this cure schedule is cooled to room temperature and removed from the mold for evaluation. The resultant cured product has the properties reported in Table III.

EXAMPLE 7

Preparation of a Cured Epoxy Resin Composition Containing the Diglycidyl Ether of 4,4'-Dihydroxy-alpha-methylstilbene and 4,4'-Dihydroxy-alpha-methylstilbene A. Preparation of B-Staged Resin 52.91 grams of the diglycidyl ether of 4,4'-dihydroxy-alphamethylstilbene (EEW=178.137; 0.297 epoxide equiv.) is placed in a forced air convection oven preheated to 160° C. After this resin has been heated to 160° C., 6.72 grams of 4,4'-dihydroxy-alpha-methylstilbene (—OH equiv. wt.= 113.145; 0.059 —OH equiv.) is added and periodic stirring of the mixture (every 3–4 minutes) is begun. After the 4,4'-dihydroxy-alpha-methylstilbene has dissolved (23 minutes after addition to the resin), 10.23 grams of sulfanilamide (amine hydrogen equiv. wt.=43.0525; 0.38 amine hydrogen equiv.) is added and periodic stirring is continued. After the sulfanilamide has dissolved (12 minutes after addition to the resin), 0.84 milliliters (0.000971 mole; 0.00199 mole of catalyst per epoxide group) of a 40 weight percent solution of tetra-n-butylphosphonium fluoroborate (422.5 molecular weight) in methanol is added and the resultant mixture is continuously stirred for 1 minute. The methanol is then removed from the B-staged resin by applying a vacuum using a bell jar.

B. Curing of B-Staged Resin

B-staged resin prepared in A. above is poured into a 7.5 inch × 7.0 inch ×0.125 inch (19.05 cm ×17.78 cm ×0.3175 cm) glass mold preheated to 160° C. The oven temperature is then reduced to 120° C. and the schedule used to cure the resin is 4 hours at 120° C., 1 hour at 140° C., 1 hour at 160° C., 1 hour at 180° C. and 4 hours at 200° C. The casting obtained using this cure schedule is cooled to room temperature and removed from the mold for evaluation. The resultant cured product has the properties reported in Table III.

EXAMPLE 8

Preparation of a Cured Epoxy Resin Composition Containing the Diglycidyl Ether of 4,4'-Dihydroxy-alpha-methylstilbene and 4,4'-Dihydroxy-alpha-methylstilbene A. Preparation of B-Staged Resin 55.61 grams of the diglycidyl ether of 4,4'-dihydroxy-alphamethylstilbene (EEW=178.137; 0.312 epoxide equiv.) is placed in a forced air convection oven preheated to 160° C. After this resin has been heated to 160° C., 14.13 grams of 4,4'-dihydroxy-alpha-methylstilbene (—OH equiv. wt.= 113.145; 0.125 —OH equiv.) is added and periodic stirring of the mixture (every 3–4 minutes) is begun. After the 4,4'-dihydroxy-alpha-methylstilbene has dissolved (20 minutes after addition to the resin), 8.064 grams of sulfanilamide (amine hydrogen equiv. wt.=43.0525; 0.187 amine hydrogen equiv.) is added and periodic stirring is continued. After the sulfanilamide has dissolved (9 minutes after addition to the resin), 0.650 milliliters (0.000751 mole; 0.00197 mole of catalyst per epoxide group) of a 40 weight percent solution of tetra-n-butylphosphonium fluoroborate (422.5 molecular weight) in methanol is added and the resultant mixture is continuously stirred for 1 minute. The methanol is then removed from the B-staged resin by applying a vacuum using a bell jar.

B. Curing of B-Staged Resin

After the methanol is removed, as evidenced by no observable outgassing, the B-staged resin prepared in A. above is poured into a 7.0 inch ×7.0 inch ×0.125 inch (17.78 cm ×17.78 cm ×0.3175 cm) glass mold preheated to 150° C. The differential scanning caorimetry analysis and viscosity data for this curable composition are given in Table II. The schedule used to cure the resin is 4 hours at 150° C., 1 hour at 175° C. and 4 hours at 200° C. The casting obtained using this cure schedule is cooled to room temperature and removed from the mold for evaluation. The resultant cured product has the properties reported in Table III.

TABLE II

| COMPONENTS & RESULTS | Comp. Expt. B* | Ex. 8 |
| --- | --- | --- |
| Equivalents of —OH to Equivalents of Epoxy Used in Composition | 0.4 | 0.4 |
| Equivalents of Sulfanilamide —NH per Equivalent of Epoxy Used in Composition | 0.6 | 0.6 |
| Catalyst | tetra-n-butyl phosphonium acetate-acetic acid complex | tetra-n-butyl phosphonium fluoborate |
| Equivalents of Catalyst per Equivalent of Epoxy Used in Composition | 0.002 | 0.002 |
| Differential Scanning Calorimetry Analysis[1]: | | |
| Onset of Cure Exotherm, °C. | 107 | 183 |
| Peak of Cure Exotherm, °C. | 168 | 203 |
| Energy of Cure Exotherm, joules/gram | 202 | 204 |
| Viscosity Data: | | |
| Minimum Viscosity Obtained on Heating, | | |
| centipoise | 1,180 @ 120° C. | 190 @ 172° C. |
| Pa · s | 1.180 @ 120° C. | 0.190 @ 172° C. |
| Viscosity @ 120° C., | | |
| centipoise | 1,180 | 460 |
| Pa · s | 1.180 | 0.460 |
| Viscosity After 5 Minutes @ 120° C., | | |
| centipoise | 3,040 | 486 |
| Pa · s | 3.040 | 0.486 |
| Viscosity After 10 Minutes @ 120° C., | | |
| centipoise | 17,770 | 561 |

TABLE II-continued

| COMPONENTS & RESULTS | Comp. Expt. B* | Ex. 8 |
|---|---|---|
| Pa · s | 17.770 | 0.561 |
| Viscosity After 15 Minutes 120° C., | | |
| centipoise | 208,640 | 647 |
| Pa · s | 208.640 | 0.647 |

*Not an example of the present invention
[1]Differential scanning caliometry was conducted at 10° C./minute under a nitrogen atmosphere

EXAMPLE 9

Preparation of a Cured Epoxy Resin Composition Containing the Diglycidyl Ether of 4,4'-Dihydroxy-alpha-methylstilbene and 4,4'-Dihydroxy-alpha-methylstilbene

A. Preparation of B-Staged Resin 55.37 grams of the diglycidyl ether of 4,4'-dihydroxy-alphamethylstilbene (EEW=178.137; 0.311 epoxide equiv.) is placed in a forced air convection oven preheated to 160° C. After this resin has been heated to 160° C., 14.07 grams of 4,4'-dihydroxy-alpha-methylstilbene (—OH equiv. wt.= 113.145; 0.124 —OH equiv.) is added and periodic stirring of the mixture (every 3–4 minutes) is begun. After the 4,4'-dihydroxy-alpha-methylstilbene has dissolved (25 minutes after addition to the resin), 8.03 grams of sulfanilamide (amine hydrogen equiv. wt.=43.0525; 0.187 amine hydrogen equiv.) is added and periodic stirring is continued. After the sulfanilamide has dissolved (10 minutes after addition to the resin), 0.65 milliliters (0.000751 mole; 0.00198 mole of catalyst per epoxide group) of a 40 weight percent solution of tetra-n-butylphosphonium fluoroborate (422.5 molecular weight) in methanol is added and the resultant mixture is continuously stirred for 1 minute. The methanol is then removed from the B-staged resin by applying a vacuum using a bell jar.

B. Curing of B-Staged Resin

After the methanol is removed, as evidenced by no observable outgassing, the B-staged resin prepared in A. above is poured into a 7.0 inch ×7.0 inch ×0.125 inch (17.78 cm ×17.78 cm ×0.3175 cm) glass mold preheated to 160° C. The oven temperature is then reduced to 120° C. and the schedule used to cure the resin is 4 hours at 120° C., 1 hour at 140° C., 1 hour at 160° C., 1 hour at 180° C. and 4 hours at 200° C. The casting obtained using this cure schedule is cooled to room temperature and removed from the mold for evaluation. The resultant cured product has the properties reported in Table III.

COMPARATIVE EXPERIMENT C

Preparation of a Cured Epoxy Resin Composition Containing the Diglycidyl Ether of 4,4'-Dihydroxy-alpha-methylstilbene and 4,4'-Dihydroxy-alpha-methylstilbene Using a Non-Cure Controlling Catalyst The B-staged resin is prepared using the method of Comparative Experiment B. Curing of the B-staged resin is completed as follows: After the methanol is removed, as evidenced by no observable outgassing, the B-staged resin is poured into a 7.0 inch ×7.0 inch ×0,125 inch (17.78 cm ×17.78 cm ×0.3175 cm) glass mold preheated to 150° C. The schedule used to cure the resin is 4 hours at 150° C., 1 hour at 175° C. and 4 hours at 200° C. The casting obtained using this cure schedule is cooled to room temperature and removed from the mold for evaluation. The resultant cured product has the properties reported in Table III.

TABLE III

| COMPONENTS AND RESULTS | Ex. 6 | Ex. 7 | Ex. 8 | Comp. Expt. C | Ex. 9 |
|---|---|---|---|---|---|
| Equivalents of phenolic —OH per Equivalent of Epoxy Used in Composition | 0.2 | 0.2 | 0.4 | 0.4 | 0.4 |
| Equivalents of Sulfanilamide —NH per Equivalent of Epoxy Used in Composition | 0.8 | 0.8 | 0.6 | 0.6 | 0.6 |
| Initial Curing Temperature, °C. | 150 | 120 | 150 | 150 | 120 |
| Appearance of Casting | Translucent | Opaque | Translucent | Translucent | Opaque |
| Morphology of Cured Composition, Cross-polarized Light Microscopy (70X Magnification) | Birefringent; Liquid Crystal Textures observed; No Dispersed Crystals Observed | Birefringent; Liquid Crystal Textures <15 Micron Domains Observed; No Dispersed Crystals Observed | Birefringent; Liquid Crystal Textures Observed; No Dispersed Crystals Observed | Low level of Birefringence; No Liquid Crystal Textures; Minor Amount of Dispersed Crystals | Birefringent; Liquid Crystal Textures & ≦5 Micron Domains Observed; No Dispersed Crystals Observed |

TABLE III-continued

| COMPONENTS AND RESULTS | Ex. 6 | Ex. 7 | Ex. 8 | Comp. Expt. C | Ex. 9 |
|---|---|---|---|---|---|
| Fracture Toughness, ($G_{IC}$), joules/m$^2$ | 444 | 942 | 635 | 430 | 915 |
| Flexural Strength, (ASTM Method D 790), | | | | | |
| psi | 12,990 | 13,635 | 11,565 | 12,556 | 12,055 |
| kPa | 89,563 | 94,010 | 79,738 | 86,561 | 83,116 |
| Flexural Modulus (ASTM Method D 790), | | | | | |
| psi | 426,000 | 417,000 | 379,000 | 378,000 | 386,000 |
| kPa | 2,937,166 | 2,875,114 | 2,613,113 | 2,606,218 | 2,661,376 |
| Glass Transition Temperature, °C. (Dynamic Mechanical Analysis) | >237 | 204 | 199 | 201 | 196 |

EXAMPLE 10

Preparation of a Cured Epoxy Resin Composition Containing the Diglycidyl Ether of 4,4'-Dihydroxy-alpha-methylstilbene and 4,4'-Dihydroxy-alpha-methylstilbene

A. Preparation of B-Staged Resin 100.36 grams of the diglycidyl ether of 4,4'-dihydroxy-alpha-methylstilbene (EEW=176.6; 0.568 epoxide equiv.) is placed in a forced air convection oven preheated to 160° C. After this resin has been heated to 160° C., 25.72 grams of 4,4'-dihydroxy-alpha-methylstilbene (—OH equiv. wt.= 113.145; 0.227 —OH equiv.) is added and periodic stirring of the mixture (every 3–4 minutes) is begun. After the 4,4'-dihydroxy-alpha-methylstilbene has dissolved (26 minutes after addition to the resin), 14.68 grams of sulfanilamide (amine hydrogen equiv. wt.=43.0525; 0.341 amine hydrogen equiv.) is added and periodic stirring is continued. After the sulfanilamide has dissolved (14 minutes after addition to the resin), 1.19 milliliters (0.001375 mole; 0.00198 mole of catalyst per epoxide group) of a 40 weight percent solution of tetra-n-butylphosphonium fluoroborate (422.5 molecular weight) in methanol is added and the resultant mixture is continuously stirred for 1 minute. The methanol is then removed from the B-staged resin by applying a vacuum using a bell jar.

B. Curing of B-Staged Resin

After the methanol is removed, as evidenced by no observable outgassing, the B-staged resin prepared in A. above is poured into a 5.5 inch ×5.0 inch ×0.25 inch (13.97 cm ×12.7 cm ×0.635 cm) glass mold preheated to 160° C. The oven temperature is then reduced to 120° C. and the schedule used to cure the resin is 4 hours at 120° C., 1 hour at 140° C., 1 hour at 160° C., 1 hour at 180° C. and 4 hours at 200° C. The casting obtained is cooled to room temperature and removed from the mold. From this casting, double-notch four-point bend specimens are prepared for the determination of fracture mechanisms. The double-notch four-point bending technique is described by H. -J. Sue and A. F. Yee in the "Study of fracture mechanisms of multiphase polymers using the double-notch four-point bonding method", *Journal of Material Science*, volume 28 (1993), which is incorporated herein by reference in its entirety. The principle for this technique is as follows: two nearly identical cracks are cut using a notching cutter (250 microns in radius), followed by liquid nitrogen chilled razor blade tapping to wedge open the sharp cracks into the same edge of a rectangular beam (5 inches ×0.5 inch × 0.25 inch; 12.7 cm ×1.27 cm ×0.635 cm). This beam is then loaded in a four-point bending geometry with the cracks positioned on the tensile side. The portion of the beam between the two inner loading points is subjected to a constant bending moment using a Sintech 2 screw driven mechanical testing machine. Thus the two cracks experience nearly identical stresses. As load is applied (crosshead speed of the testing machine =0.2 inch (0.508 cm) per minute), plastic zones form in front of the crack tips. Since the two cracks cannot be exactly identical, one crack will propagate unstably, leaving behind the other crack with a nearly critically developed process zone at its tip. Since this crack is arrested, the events in the crack tip process are not obliterated and can be examined. When viewed by scanning electron micoscopy, the fracture surface produced by the cured resin composition containing the diglycidyl ether of 4,4'-dihydroxy-alpha-methylstilbene and 4,4'-dihydroxy-alpha-methylstilbene exhibits a rough, tendril-like appearance indicative of high toughness and ductility. By way of contrast, conventional epoxy resins, such as prepared in Comparative Example A, exhibit a smooth, glassy, featureless surface. Thin sectioning of the crack tip damage zone and microscopy are then applied to probe the fracture mechanisms which occur at the crack tip and its wake. In examinations of the crack tip damage zone using a JEOL 2000FX ATEM transmission electron microscope operating at an accelerating voltage of 100 kV, a birfurcated, highly branched crack containing segmented and bridged regions of polymer within the crack is observed. Another observation made by transmission electron microscopy is that the spherical liquid crystal domains present in the cured composition are distorted to elongated liquid crystal domains in the crack wake. This type of behavior may be indicative of transformation or orientational toughening.

EXAMPLE 11

Preparation of a Glass Laminate Containing the Diglycidyl Ether of 4,4'-Dihydroxy-alpha-methylstilbene

A. Preparation of B-Staged Resin

The following components are combined and heated to 150° C. in a stirred, 2 liter resin kettle:

1. The diglycidyl ether of 4,4'-dihydroxy-alpha-methylstilbene —160.23 grams —(EEW=179.337; 0.893 epoxide equiv.),
2. Tetrabromobisphenol A —49.06 grams (—OH equiv. wt.=272.0; 0.180 phenolic equiv.)

After heating to 150° C., 30.70 grams of sulfanilamide (amine hydrogen equiv. wt.=43.0525; 0.713 amine hydrogen equiv.) is added. After the sulfanilamide has dissolved (approximately 8 minutes after addition), 1.70 milliliters (0.001964 mole; 0.00198 mole of catalyst per epoxide group) of a 40 weight percent solution of tetra-n-butylphosphonium fluoroborate (422.5 molecular weight) in methanol is added and the resultant mixture is stirred for 1 minute. The methanol is then removed from the B-staged resin by applying a vacuum to the resin kettle.

B. Preparation of Cured Glass Laminate Using B-Staged Resin

After the methanol is removed, as evidenced by no observable outgassing, the B-staged resin prepared in A. above is poured onto a mold plate which is at room temperature (approximately 23° C.). 270 grams of a 9 ply preform prepared from glass fabric is then applied to the top of the resin. The glass fabric used is obtained from BGF Industries, Inc. and has a designation for style and finish of 7628 and I621, respectively. A sealed mold is then constructed around the resin and preform by bolting down to the mold plate a steel picture frame (15.25 inch ID ×15.25 inch ID ×0.25 inch (38.735 cm ×38.735 cm ×0.635 cm) deep) covered with a 0.004 inch thick film of polyimide (UPILEX™ marketed by ICI Films). This mold is then placed in a mechanical press where full vacuum is applied to the mold using a vacuum pump. The press is then heated to 120° C. over a 18.5 minute period. After holding the temperature at 120° C. for 11.7 minutes, 200 pounds per square inch pressure is applied to the mold using the mechanical press. After applying this pressure, the cure schedule used for the laminate is 5 hours at 120° C., 1 hour at 140° C., 1 hour at 160° C., 1 hour at 180° C. and 4 hours at 200° C. After 4 hours at 200° C., the mold is cooled to room temperature and the laminate (15.25 inch ×15.25 inch ×0.064 inch) is removed. The properties for the laminate are given below:

1. Glass transition temperature by differential scanning calorimetry= 180° C.;
2. Burn time in UL-94 test (5 specimens/10 burns)=55.7 seconds;
3. Methylene chloride absorption after 30 minutes submersion at room temperature=0.04 weight percent;
4. No blistering observed for ten 2 inch ×3 inch (5.08 cm ×7.62 cm) samples exposed to autoclave conditions of 250° F. and 15 psi (103.421 kPa) for 2 hours followed by a 20 second solder dip at 550° F.;
5. Room Temperature Dielectric Properties=see Table IV.

TABLE IV

Room Temperature Dielectric Properties for Laminate Prepared in Example 11

| Frequency, KHz | Dielectric Constant | Dissipation Factor |
| --- | --- | --- |
| 1.00 | 5.243 | 0.01125 |
| 2.00 | 5.215 | 0.01269 |
| 5.00 | 5.173 | 0.01474 |
| 10.00 | 5.137 | 0.01612 |
| 20.00 | 5.098 | 0.01721 |

TABLE IV-continued

Room Temperature Dielectric Properties for Laminate Prepared in Example 11

| Frequency, KHz | Dielectric Constant | Dissipation Factor |
| --- | --- | --- |
| 50.00 | 5.044 | 0.01808 |
| 100.00 | 5.002 | 0.01848 |

What is claimed is:

1. A curable composition comprising;
   (A) at least one epoxy resin having an average of more than one vicinal epoxide group per molecule;
   (B) at least one curing agent for said epoxy resin in an amount which provides from about 0.8 to about 1.5 equivalents of curing agent per epoxide group; and
   (C) about 0.00005 to about 0.1 mole per epoxide equivalent of a cure controlling catalyst represented by any of the following formulas:

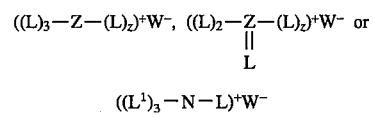

wherein each L is independently a hydrocarbyl group or inertly substituted hydrocarbyl group having from 1 to about 18 carbon atoms, which group also can contain one or more oxygen, sulfur or nitrogen atoms or two of such L groups can combine to form a heterocyclic ring containing one or more atoms other than carbon atoms; each $L^1$ is independently hydrogen or L; Z is nitrogen, phosphorus, sulfur or arsenic; W is a weak nucleophilic anion selected from the group consisting of $BF_4^-$, $BCl_4^-$, $NO_3^-$, $F^-$, $Cl-CH_2-CH_2-CO_2^-$, $HO-CH_2-CH_2-CO_2^-$, $SbF_5^-$, $SbCl_5^-$, $AsF_4^-$, $AsCl_4^-$, $FP(O)_2(OH)^-$, $(F)_2PO(O)_2^-$, $F_3B(OH)^-$, $F_2B(OH)_2^-$ and $ClP(O)_2(OH)^-$; and z has a value of zero or 1 depending on the valence of Z;

wherein at least one epoxy resin of component (A) is an epoxy resin which contains at least one mesogenic moiety represented by any one or more of the following formulas:

Formula II

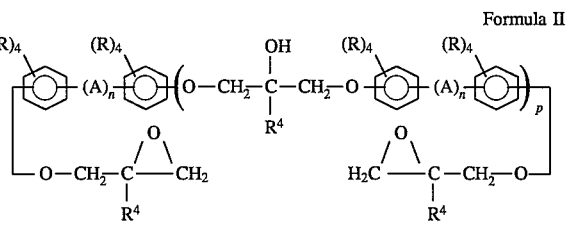

Formula V

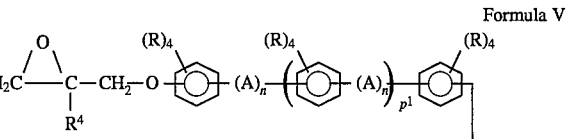

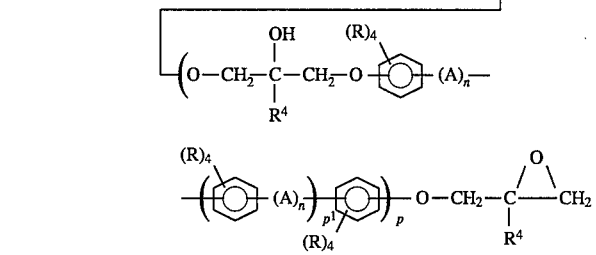

-continued

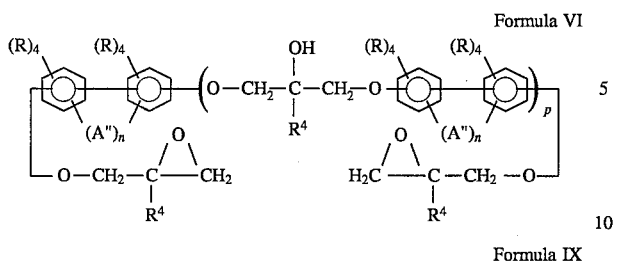

Formula VI

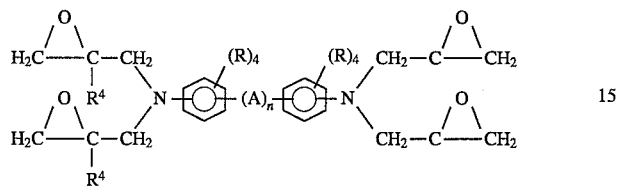

Formula IX wherein: each R is independently hydrogen or a monovalent hydrocarbyl or hydrocarbyloxy group having from one to about carbon atoms, a halogen atom, a nitro group, a nitrile group or a —CO—R² group; R² is hydrogen or a monovalent hydrocarbyl group having from one to about 10; n has a value of zero or one; each A is independently a direct single bond, a divalent hydrocarbyl group having from one to about carbon atoms, —O—, —CO—, —SO—, —SO$_2$—, —S—, —S—S—, —CR$^1$=CR$^1$—, —C≡C—, —N=N—, —CR$^1$=N—, —N=CR$^1$—, —O—CO—, —CO—O—, —S—CO—, —CO—S—, —NR$^1$—CO—, —CO—NR$^1$—, —CR$^1$=N—N=CR$^1$—, —CO—CR$^1$=CR$^1$—, —CR$^1$=CR$^1$—CO—, —CR$^1$=N—O—OC—, —CO—O—N=CR$^1$—, —CO—NR$^1$—NR$^1$—OC—, —CR$^1$=CR$^1$—O—OC—, —CO—O—CR$^1$=CR$^1$—, —O—CO—CR$^1$=CR$^1$—, —CR$^1$=CR$^1$—CO—O—, —(CHR$^1$)$_n$—O—CO—CR$^1$=CR$^1$—, —CR$^1$=CR$^1$—CO—O—(CHR$^1$)$_{n'}$—, —(CHR$^1$)$_n$—CO—O—CR$^1$=CR$^1$—, —CH$^1$=CH$^1$—O—CO—(CHR$^1$)$_{n'}$—, —CH$_2$—CH$_2$CO—O—, —O—OC—CH$_2$—CH$_2$—, —C≡C—C≡C—, —CR$^1$=CR$^1$—CR$^1$=CR$^1$—, —CR$^1$=CR$^1$—C≡C—, —C≡C—CR$^1$=CR$^1$—, —CR$^1$=CR$^1$—CH$_2$—O—OC—, —CO—O—CH$_2$—CR$^1$=CR$^1$, —O—CO—C≡C—CO—O—, —O—CO—CR$^1$=CR$^1$—CO—O—, —O—CO—CH$_2$—CH$_2$—CO—O—, —S—CO—CR$^1$=CR$^1$—CO—S—, —CO—CH$_2$—NH—CO—, —CO—NH—CH$_2$—CO—, —NH—C(—CH$_3$)=CH—CO—, —CO—CH=C(—CH$_3$)—NH—, —CR$^1$=C(—Cl)—, —C(—Cl)=CR$^1$—, —CR$^1$=C(—CN)—, —C(—CN)=CR$^1$—, —N=C(—CN)—, —C(—CN)=N—, —CR$^1$=C(—CN)—CO—O—, —O—CO—C(—CN)=CR$^1$—,

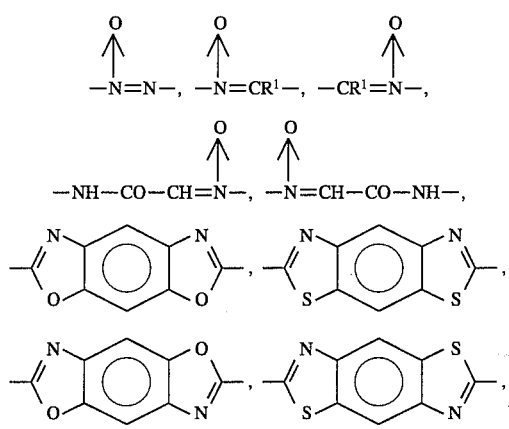

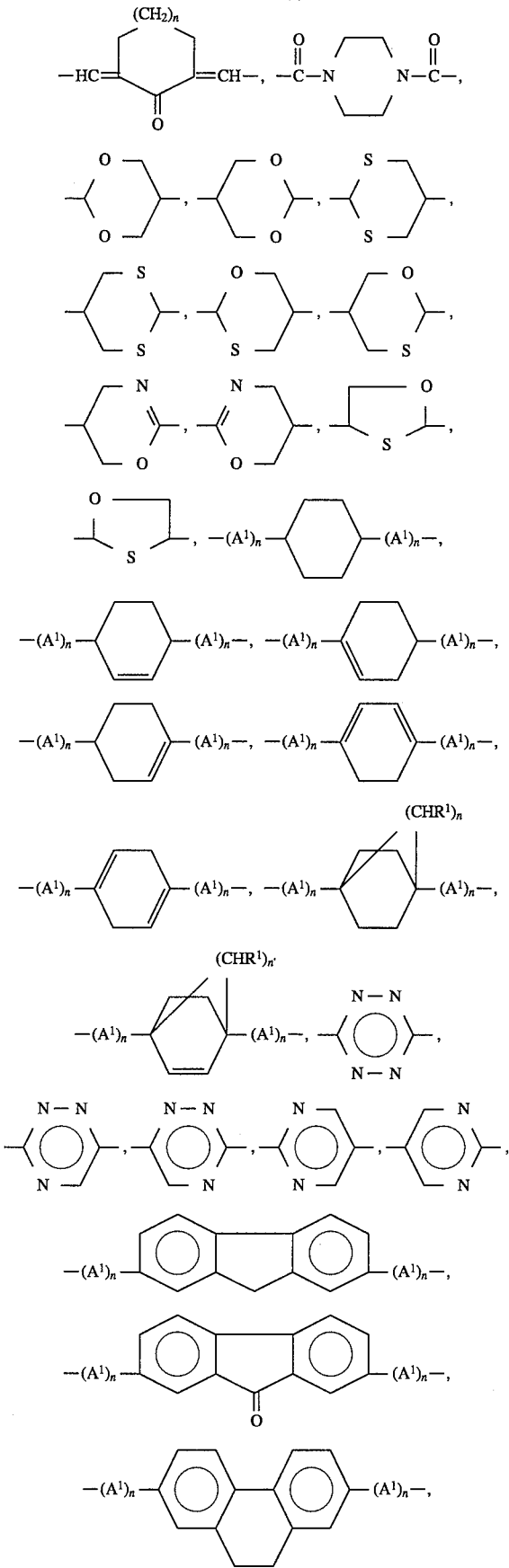

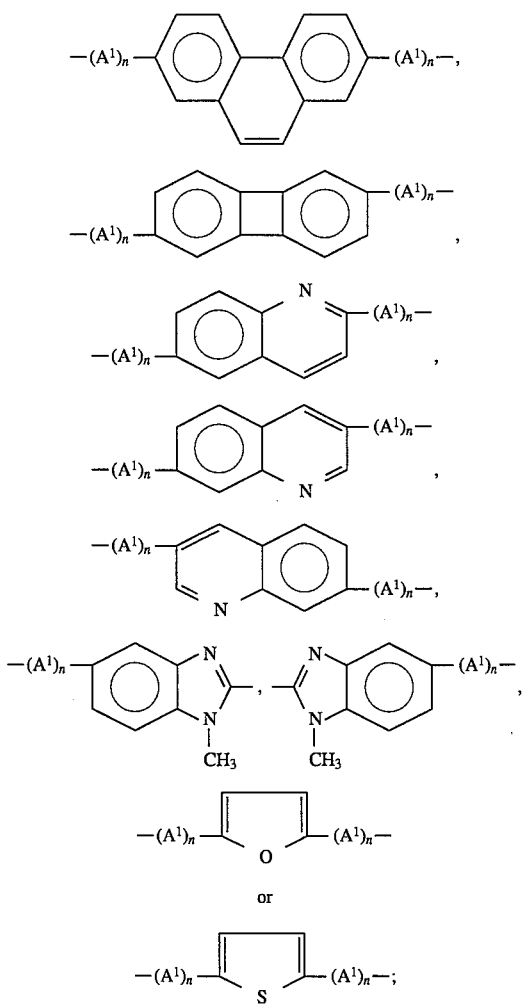

each A" is a divalent hydrocarbyl group having from one to about 6 carbon atoms; each $A^1$ is independently a —CO—, —O—CO—, —CO—O—, —CO—S—, —S—CO—, —CO—$NR^1$— or —NR1—CO—; each $R^1$ is independently hydrogen or a monovalent hydrocarbyl group having from one to about 6 carbon atoms; each $R^4$ is independently hydrogen or a monovalent hydrocarbyl group having from one to about 3 carbon atoms; n' has a value of one or two; p has a value from zero to about 30; and $p^1$ has a value of from one to about 30, which, optionally, has been subjected to either (a) the application of an electric field, (b) the application of a magnetic field, (c) drawing or shear forces, or (d) any combination thereof.

2. A curable composition of claim 1 wherein component (C) is ethyl(tritolyl)phosphonium tetrahaloborate, ethyl(tritolyl)ammonium tetrahaloborate, tetrabutyl phosphonium tetrahaloborate, benzyltrimethylammonium tetrahaloborate, tetrabutylammonium tetrahaloborate, triethylamine.tetrahaloboric acid complex, tributylamine.tetrahaloboric acid complex, N,N'-dimethyl-1,2-diamingethane.tetrahaloboric acid complex or any combination thereof.

3. A curable composition of claim 1 which has been subjected to either (a) the application of an electric field, (b) the application of a magnetic field, (c) drawing or shear forces, or (d) any combination thereof.

4. A curable composition of claim 2 which has been subjected to either (a) the application of an electric field, (b) the application of a magnetic field, (c) drawing or shear forces, or (d) any combination thereof.

5. A curable composition of claim 1 which has not been subjected to either (a) the application of an electric field, (b) the application of a magnetic field, (c) drawing or shear forces, or (d) any combination thereof.

6. A curable composition of claim 2 which has not been subjected to either (a) the application of an electric field, (b) the application of a magnetic field, (c) drawing or shear forces, or (d) any combination thereof.

* * * * *